US010090529B2

(12) United States Patent
Arpin et al.

(10) Patent No.: US 10,090,529 B2
(45) Date of Patent: Oct. 2, 2018

(54) MONOLITHIC POROUS OPEN-CELL STRUCTURES

(71) Applicant: Xerion Advanced Battery Corporation, Champaign, IL (US)

(72) Inventors: Kevin A. Arpin, Champaign, IL (US); John D. Busbee, Beavercreek, OH (US); Hailong Ning, Champaign, IL (US); Thuy D. Dang, Centerville, OH (US); Justin Lenoff, Champaign, IL (US); Huigang Zhang, Champaign, IL (US)

(73) Assignee: XERION ADVANCED BATTERY CORP., Champaign, IL (US)

( * ) Notice: Subject to any disclaimer, the term of this patent is extended or adjusted under 35 U.S.C. 154(b) by 0 days.

(21) Appl. No.: 14/806,040

(22) Filed: Jul. 22, 2015

(65) Prior Publication Data

US 2016/0028089 A1 Jan. 28, 2016

Related U.S. Application Data

(60) Provisional application No. 62/027,570, filed on Jul. 22, 2014.

(51) Int. Cl.
*H01M 4/04* (2006.01)
*H01M 4/66* (2006.01)
*H01M 4/80* (2006.01)
*H01M 4/02* (2006.01)

(52) U.S. Cl.
CPC ............. *H01M 4/80* (2013.01); *H01M 4/04* (2013.01); *H01M 4/0452* (2013.01); *H01M 4/661* (2013.01); *H01M 2004/021* (2013.01)

(58) Field of Classification Search
CPC ...... H01M 4/0452; H01M 4/661; H01M 4/04; H01M 4/80
USPC ......... 429/208–246; 29/623.1–623.5; 205/75
See application file for complete search history.

(56) References Cited

U.S. PATENT DOCUMENTS

| | | | |
|---|---|---|---|
| 3,166,615 A | 1/1965 | Farrell | |
| 5,968,685 A * | 10/1999 | Harada | B22F 3/1137 264/104 |
| 6,680,013 B1 | 1/2004 | Stein et al. | |
| 8,237,538 B2 | 8/2012 | Braun et al. | |

(Continued)

FOREIGN PATENT DOCUMENTS

EP        0801152        10/1997

OTHER PUBLICATIONS

Arora et al., Battery separators, Chemical Reviews, 2004, 104: 4419-4462.

(Continued)

*Primary Examiner* — Sean P Cullen
(74) *Attorney, Agent, or Firm* — Bryan Cave Leighton Paisner LLP

(57) ABSTRACT

Process for the fabrication and manufacture of highly porous open-cell structures using templates that are formed by mechanical pressing, injection molding, sintering, or any combination thereof. The processing scheme includes coating, filling or depositing a material on, or inside the porous template. The highly porous structure results after the selective removal of the template and can be used for various applications such as electrochemical energy storage devices including high power and high-energy lithium-ion batteries.

24 Claims, 19 Drawing Sheets

(56) References Cited

U.S. PATENT DOCUMENTS

2008/0246580 A1    10/2008  Braun et al.
2012/0301387 A1*  11/2012  Neumann ............... C03B 19/14
                                                                                423/445 R

OTHER PUBLICATIONS

Long et al., Three-dimensional battery architectures. Chemical Reviews 2004, 104(10), 4463-4492.
Lee et al., Synthesis and Rate Performance of Monolithic Macroporous Carbon Electrodes for Lithium-Ion Secondary Batteries, Advanced Functional Materials, 2005, 15(4): 547-556.
Zhang et al., Three-dimenstional bicontinuous ultrafast-charge and -discharge bulk battery electrodes, Nature Nanotechnology, 2011, 6(5): 277-281.
Patent Cooperation Treaty, International Search Report for PCT/US2015/041515, dated Nov. 3, 2015, 4 pages.

* cited by examiner

MONOLITHIC POROUS OPEN-CELL STRUCTURES

The present disclosure generally relates to structures for use in energy storage devices such as primary and secondary batteries, fuel cells and capacitors, filtration devices, heat sinks, structural components and a range of articles incorporating monolithic porous open-cell structures. In one such exemplary embodiment, the monolithic porous open-cell structures are incorporated into an anode structure, a cathode structure, or both an anode and a cathode structure for use in a primary or secondary battery.

Highly porous structures can exhibit unique physical, chemical, optical, and electrochemical properties that are not possible using bulk materials. These special properties are useful for applications including sensing, biomedical scaffolds, catalysis, filtration, separation, and energy storage.

Highly porous structures that are conductive and have pore sizes ranging from the nanometer scale to the micrometer scale are particularly interesting for electrochemical energy storage applications including batteries and capacitors. These conductive, porous structures are commonly fabricated by infiltrating a porous template with a desired conductive material and subsequent selective removal of the template. Techniques to make such templates include colloidal self-assembly, interference lithography, direct writing of multifunctional inks, direct laser writing in a photoresist, layer by layer stacking of components fabricated by conventional 2D lithography, block co-polymers, and dealloying. These templates are sacrificial and varying degrees of order are achieved depending on the fabrication scheme.

There are also numerous reports of conventional polymeric foams with larger pore sizes that, when coated with metallic materials, can be implemented in battery electrode designs. One example in particular utilized three different porous substrates including a carbon-coated urethane foam, carbon-coated bonded organic fibers, and nonwoven carbon fabric. For example, in EP 0801152 B1, Tsubouchi et al. disclose conformally coating porous templates with iron by electrodeposition to form a highly porous metal structure useful for battery electrodes.

More recently, Braun et. al. demonstrated a highly porous nickel structure coated with a battery active material that is capable of ultrafast charge and discharge. See, e.g., Zhang, H. G., Yu, X. D., & Braun, P. V., Three-dimensional bicontinuous ultrafast-charge and -discharge bulk battery electrodes. Nature Nanotechnology 6 (5), 277-281 (2011) and Zhang, H., Yu, X., & Braun, P. V., U.S. Pat. No. 8,237,538 B2. The enhanced power performance of these electrodes is attributed to the reduced ion and electron transfer lengths. The highly porous nickel structures were fabricated by the template directed electrodeposition of nickel. The template used was an ordered arrangement of polystyrene colloids, commonly termed a colloidal crystal. After nickel electrodeposition, the template was removed, resulting in a porous nickel structure, termed an inverse colloidal crystal.

In U.S. Pat. No. 6,680,013, Stein et al. disclose a similar method to form highly porous conductive structures. As disclosed therein, ordered arrangements of organic polymer colloids were infiltrated with inorganic precursors for metals and metal alloys. Following template removal, the precursors were converted to the metallic form resulting in a highly porous conductive structure. Stein et al. also published similar methods to make highly porous carbon (also conductive) structures for lithium-ion battery applications; see, Lee, K. T., Lytle, J. C., Ergang, N. S., Oh, S. M., & Stein, A., Synthesis and rate performance of monolithic macroporous carbon electrodes for lithium-ion secondary batteries. Advanced Functional Materials 15 (4), 547-556 (2005).

In U.S. Pat. No. 3,166,615, Farrell discloses an alternative method to forming highly porous conductive structures using colloids. Colloidal particles comprising metallic, quartz, or refractory metals with sizes ranging from 1 μm to 700 μm, or more, were coated with a fluid thermosetting resin. Next, the coated particles were compacted, forcing the particles to be in direct contact. A porous, non-conductive structure resulted following curing of the resin and removal of the particles. The highly porous polymer structure can be readily coated with a conductive material for battery electrode applications.

Despite the advances made to-date, a need remains for an improved process for the preparation of monolithic porous open-cell structures that may be incorporated into storage devices such as primary and secondary batteries, fuel cells and capacitors, filtration devices, heat sinks, structural components.

Among the various aspects of the present disclosure is the provision of monolithic porous open-cell structures that may be incorporated into storage devices such as primary and secondary batteries, fuel cells and capacitors, filtration devices, heat sinks, structural components.

Briefly, therefore, one aspect of the present disclosure is a process for the preparation of a monolithic porous open-cell structure. The process comprises forming a mass of microparticles to form a template, the template comprising microparticles and interstitial volume between the microparticles within the mass, the surfaces of the microparticles within the template having contacting surface regions that contact the surfaces of other microparticles within the mass and non-contacting surface regions bounding the interstitial volume. The mass of microparticles is consolidated to form a template wherein consolidating comprises compressing or sintering the mass of microparticles. The template is infiltrated with a framework material that coats the non-contacting surface regions of the microparticles, and the template is removed to form a monolithic porous open-cell structure comprising a skeletal network comprising the framework material and having a void volume fraction of at least 25%.

Another aspect of the present disclosure is a monolithic porous open-cell structure comprising a three-dimensional network of interconnected unit cells, the unit cells being bounded by a framework material and having interconnectivity windows for fluid flow between the unit cells. The monolithic porous open-cell structure has a void volume fraction of at least 25% and the unit cells have an average size in the range of about 10 nm to about 100 μm. In one such embodiment, the monolithic porous open-cell structure has an average size relative standard deviation of greater than 5%. In another such embodiment, the monolithic porous open-cell structure has an average size relative standard deviation of less than 5%.

Another aspect of the present disclosure is a three-dimensional network of interconnected unit cells, the unit cells being bounded by an electrically conductive framework having interconnectivity windows for fluid flow between the unit cells. The monolithic porous open-cell structure has a void volume fraction of at least 25% and the unit cells have an average size in the range of about 10 nm to about 100 μm, an average aspect ratio in the range of about 1:1 to about 10:1. In one such embodiment, the unit cells have an aspect ratio relative standard deviation of at least 5%. In another such embodiment, the unit cells have an aspect ratio relative standard deviation of less than 5%.

Another aspect of the present disclosure is a monolithic porous open-cell structure comprising a three-dimensional network of interconnected unit cells, the unit cells being bounded by an electrically conductive framework having interconnectivity windows for fluid flow between the unit cells. The monolithic porous open-cell structure has a void volume fraction of at least 25%, the unit cells have an average size in the range of about 10 nm to about 100 µm, and the interconnectivity windows have an average size in the range of about 20 to 99% of the average unit cell size. In one such embodiment, the interconnectivity windows have an average size relative standard deviation greater than 5%. In another such embodiment, the interconnectivity windows have an average size relative standard deviation less than 5%.

Another aspect of the present disclosure is a monolithic porous open-cell structure comprising a three-dimensional network of interconnected unit cells, the unit cells being bounded by an electrically conductive framework having interconnectivity windows for fluid flow between the unit cells. The monolithic porous open-cell structure having a void volume fraction of at least 25%, the unit cells have an average size in the range of about 10 nm to about 100 µm, the interconnectivity windows have an average size in the range of about 20 to 99% of the average unit cell size, an average aspect ratio in the range of about 1:1 to about 10:1 and an aspect ratio relative standard deviation greater than 5%.

Another aspect of the present disclosure is a monolithic porous open-cell structure comprising a three-dimensional network of interconnected unit cells, the unit cells being bounded by an electrically conductive framework having interconnectivity windows for fluid flow between the unit cells. The monolithic porous open-cell structure has a void volume fraction of at least 25%, the unit cells have an average size in the range of about 10 nm to about 100 µm, the interconnectivity windows have an average size in the range of about 20 to 99% of the average unit cell size, the porous open-cell structure has a first surface (e.g., a top surface), an opposing second surface (e.g., a bottom surface), a thickness T as measured from the first to the second surface, a first surface region extending from the first surface and toward the second surface and having a thickness $T_1$, a second surface region extending from the second surface and toward the first surface and having a thickness $T_2$, and an average unit cell size gradient from the first to the second surface, wherein a ratio of the average unit cell size in the second surface region to the average unit cell size in the first surface region is in the range of 1:1 to 10:1.

Other objects and features will be in part apparent and in part pointed out hereinafter.

BRIEF DESCRIPTION OF THE DRAWINGS

Corresponding reference characters indicate corresponding parts throughout the drawings.

DEFINITIONS

Figure 1A:
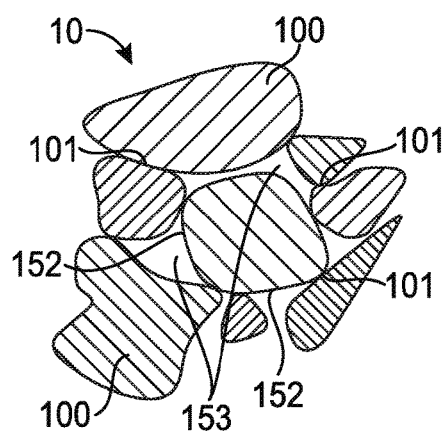
FIG. 1A is a schematic illustration of a microparticulate mass that may be used to prepare a monolithic porous open-cell structure of the present disclosure.

The term "aspect ratio" as used in connection with an interconnectivity window of a unit cell of a porous structure is the ratio of the largest dimension of the interconnectivity window to the smallest dimension of the interconnectivity window that is orthogonal to the largest dimension of the interconnectivity window as viewed in a representative two-dimensional cross-section of the porous structure.

The term "aspect ratio" as used in connection with a microparticle is the ratio of the largest dimension of the microparticle to the smallest dimension of the microparticle that is orthogonal to the largest dimension.

The term "aspect ratio" as used in connection with a unit cell of a porous structure is the ratio of the largest dimension of the unit cell to the smallest dimension of the unit cell that is orthogonal to the largest dimension as viewed in a representative two-dimensional cross-section of the porous structure.

The term "average aspect ratio" as used in connection with the interconnectivity windows of the unit cells of a porous structure is the arithmetic mean of the aspect ratios of a representative sample size of at least 20 interconnectivity windows of the unit cells of the porous structure and preferably at least 50 interconnectivity windows of the unit cells of the porous structure as viewed in a representative two-dimensional cross-section of the porous structure.

The term "average aspect ratio" as used in connection with a population of microparticles is the arithmetic mean of the aspect ratios of a representative sample size of the population.

The term "average aspect ratio" as used in connection with the unit cells of a porous structure is the arithmetic mean of the aspect ratios of a representative sample size of at least 20 unit cells of the porous structure and preferably at least 50 unit cells of the porous structure as viewed in a representative two-dimensional cross-section of the porous structure. In those embodiments in which there exists a gradient of unit cell size, the unit cells included as part of the representative sample size span the entire gradient.

The term "relative standard deviation" as used herein in connection with a characteristic (e.g., aspect ratio or size) is the standard deviation divided by the mean value for that characteristic expressed as a percentage. For example, the relative standard deviation as used in connection with the size of a unit cell within a population is the quotient of the standard deviation for the unit cell size and the mean unit cell size, expressed as a percentage.

The term "size" as used in connection with an interconnectivity window of a unit cell is the largest dimension of the interconnectivity window of the unit cell as viewed in a representative two-dimensional cross-section of the porous structure.

The term "size" as used herein in connection with a microparticle is the largest dimension of the microparticle.

The term "size" as used in connection with a unit cell is the largest dimension of the unit cell as viewed in a representative two-dimensional cross-section of the porous structure.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

DETAILED DESCRIPTION OF THE PREFERRED EMBODIMENTS

Among the various aspects of the present disclosure may be noted three-dimensional structures offering particular advantages when incorporated into energy storage devices such as batteries, capacitors, and fuel cells. For example, such structures may be incorporated into secondary batteries in which the positive electrode, negative electrode, and/or a separator are non-laminar (non-laminated) in nature. In one preferred exemplary embodiment, such structures are incorporated into secondary batteries in which carrier ions (selected, for example, from aluminum, lithium, sodium, potassium, calcium and magnesium ions) move between the positive and negative electrodes. In accordance with one aspect of the present disclosure, a monolithic porous open-cell structure may be prepared from a template comprising a consolidated population of microparticles with the resulting porous open-cell structure being an inverse of the template.

In general, a monolithic porous structure of the present disclosure is prepared by a template-directed method and is derived from an interconnected, porous template structure. In one embodiment, a microparticulate mass is formed, the microparticulate mass is consolidated to form the template, the template is infiltrated with a framework material, and the template is then removed, leaving a monolithic porous structure comprising the framework material as schematically illustrated, for example, in FIGS. 1A to 1F.

In accordance with one embodiment of the present disclosure and referring now to FIG. 1A, a microparticulate mass, generally indicated at reference numeral 10, comprising a population of microparticles 100 is formed. For ease of illustration, in this schematic microparticulate mass 10 comprises only eight particles; it should be understood, however, that in practice and in the context of the other figures described herein the microparticulate mass will contain a significantly greater quantity of microparticles than those illustrated herein. Microparticulate mass 10 may be formed, for example, by depositing the population of microparticles 100 onto a supporting structure (not shown) such as a rigid or flexible substrate or into a mold.

Individual microparticles 100 within the population have contacting surface regions 101 that contact other microparticle(s) in the mass and non-contacting surface regions 152 that are not in contact with other microparticles within the mass. Interstitial regions 153, bounded by non-contacting surface regions 152, comprise the interstitial space between the microparticles 100. A significant fraction, but not necessarily all of the interstitial regions are interconnected. As a result, microparticulate mass 10 is an interconnected, porous open cell structure having a volume that includes the volume collectively occupied by the microparticles 100 and the interstitial volume occupied by interstitial regions 153 between the microparticles.

Microparticulate mass 10 may be formed from a population of microparticles 100 by various techniques. In one embodiment, microparticles 100 are deposited as a free-flowing powder (i.e., without being dispersed in a solvent or other liquid vehicle) onto or into a supporting structure (not shown). In other embodiments, microparticles 100 are dispersed in a solvent or other liquid vehicle in the form of a slurry and then dropped, spun, tape cast or otherwise deposited into or onto the supporting structure. In the examples below, a solvent-based slurry delivery method was used for convenience; it should be understood, however, this is not a requirement and it is anticipated that handling the microparticles in powder form may be easier at large scales.

Figure 1B:
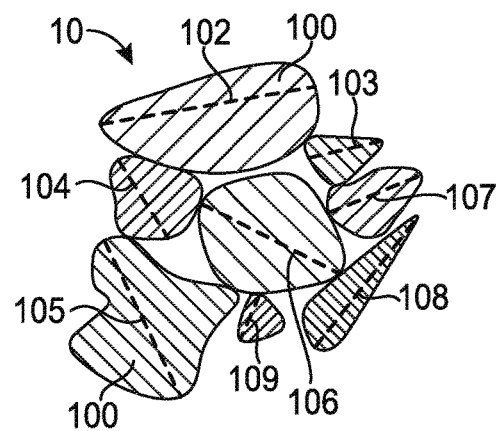
FIG. 1B is a schematic illustration of a microparticulate mass that may be used to prepare a monolithic porous open-cell structure of the present disclosure.

Referring to now to FIG. 1B, the microparticles 100 comprised by microparticulate mass 10 have a size generally indicated by reference numerals 102, 103, 104, 105, 106, 107, 108, and 109, respectively. In one exemplary embodiment, a porous open-cell structure is derived from a population of microparticles having an average size in the range of about 10 nm to about 100 µm. For example, in one such embodiment the population of microparticles has an average size in the range of about 10 nm to 50 µm. By way of further example, in one such embodiment the population of microparticles has an average size in the range of about 10 nm to about 25 µm. By way of further example, in one such embodiment the population of microparticles has an average size in the range of about 10 nm to about 10 µm. By way of further example, in one such embodiment the population of microparticles has an average size in the range of about 100 nm to about 10 µm. By way of further example, in one such embodiment the population has an average size in the range of about 0.2 µm to about 2 µm. By way of further example, in one such embodiment the population has an average size in the range of about 0.4 µm to about 2 µm. By way of further example, in one such embodiment the population has an average size in the range of about 0.5 µm to about 1.5 µm.

The particle size distribution within the microparticle population may vary, with the relative standard deviation being one measure of particle size distribution. In some embodiments, for example, the relative standard deviation of the particle size within the population may be as little as 5% and in other embodiments as great as 99%. In certain embodiments, the relative standard deviation may be in the range of about 25% to about 75%. By way of further example, in one embodiment the relative standard deviation may be in the range of about 35% to about 75%. By way of further example, in one embodiment, the relative standard deviation may be in the range of about 55% to about 65%. In each of these embodiments, the relative standard deviation may be for a population having an average size in the range of 100 nm to 100 µm, 0.1 µm to 10 µm, 0.2 µm to 2 µm, 0.4 µm to 2 µm or even 0.5 µm to 1.5 µm.

In one embodiment, the particle size distribution of the microparticle population constituting the microparticulate mass has a single mode. That is, the particle size probability distribution has a single global maximum. In another embodiment, the particle size distribution within the microparticle population has two modes. That is, the particle size probability distribution has two local maximums. By way of a further example, the particle distribution within the microparticle population has more than two modes. That is the particle size probability distribution has more than two local maximums. Experimentally, for example, a population of microparticles with a bimodal distribution can be realized by mixing two different populations of microparticles, each with a different single mode.

The microparticles within the population may have a range of shapes and a range of distributions of shapes. For example, in one embodiment, the population comprises regularly shaped microparticles such as flakes, strands, spheres, ellipsoids, rods, cubes, etc. In another embodiment, the population comprises irregularly shaped particles. By way of further example, in certain embodiments, the population may comprise a mixture of regularly shaped microparticles and irregularly shaped microparticles. Thus, in certain embodiments the population may comprise, on a weight basis, at least 10% irregularly shaped particles. For example, in one embodiment the population may comprise at least 20 wt % irregularly shaped particles. By way of further example, in one embodiment the population may comprise at least 30 wt % irregularly shaped particles. By way of further example, in one embodiment the population may comprise at least 40 wt % irregularly shaped particles. By way of further example, in one embodiment the population may comprise at least 50 wt % irregularly shaped particles. By way of further example, in one embodiment the population may comprise at least 60 wt % irregularly shaped particles. By way of further example, in one embodiment the population may comprise at least 70 wt % irregularly shaped particles. By way of further example, in one embodiment the population may comprise at least 80 wt % irregularly shaped particles. By way of further example, in one embodiment the population may comprise at least 90 wt % irregularly shaped particles. By way of further example, in one embodiment the population may comprise at least 95 wt % irregularly shaped particles.

In one embodiment, the size of the microparticles may vary as a function of relative position within the microparticulate mass. For example, in one embodiment discrete regions of the microparticulate mass may be populated by microparticles having different average particle sizes or even different particle size distributions or shapes (e.g., an upper region of the mass may have a smaller average particle size than a lower region of the mass). By way of further example, in one embodiment the population of microparticles may have an average particle size gradient wherein the average particle size increases in one or more directions within the microparticulate mass. in one exemplary embodiment microparticles having a larger size are spatially segregated towards the bottom of the mass and smaller particles are segregated towards the top of the sample template. This may be accomplished, for example, by first dispersing all particles in solution and drop casting or tape casting that solution on a flat substrate or die. During drying, the larger particles tend to sediment towards the bottom of the mass faster than smaller particles. After drying is complete, the average particle size toward the bottom of the mass is larger than the average particle size toward the top of the mass. This distribution is manifested as a particle size gradient and the size distribution may be characterized by measuring the average particle size in the top region of the mass and comparing that to the average particle size in the bottom region of the mass. For example, in one embodiment the ratio of the average particle size in the bottom one-half of the mass to the average particle size in the top one-half of the mass is at least 1.1:1, respectively. By way of further example, in one embodiment the ratio of the average particle size in the bottom one-half of the mass to the average particle size in the top one-half of the mass is at least 2:1, respectively. By way of further example, in one embodiment the ratio of the average particle size in the bottom one-half of the template to the average particle size in the top one-half of the template is at least 3:1, respectively. By way of further example, in one embodiment the ratio of the average particle size in the bottom one-half of the mass to the average particle size in the top one-half of the mass is at least 4:1, respectively. By way of further example, in one embodiment the ratio of the average particle size in the bottom one-half of the mass to the average particle size in the top one-half of the mass is at least 5:1, respectively.

Independent of the regularity or irregularity of their shape, the microparticles within the population may have a range of aspect ratios. Thus, for example, in one embodiment the microparticles have an average aspect ratio of about 1:1 to about 10:1. By way of further example, in one embodiment the microparticles have an average aspect ratio of about 1:1 to about 5:1. By way of further example, in one embodiment the microparticles have an average aspect ratio of about 1:1 to about 4:1. By way of further example, in one embodiment the microparticles have an average aspect ratio of about 1:1 to about 3:1. By way of further example, in one embodiment the microparticles have an average aspect ratio of about 1:1 to about 2:1. By way of further example, in one embodiment the microparticles have an average aspect ratio of about 1:1 to about 1.5:1. In one such embodiment, the microparticles may have a relative standard deviation of aspect ratio of less than 5%. In another embodiment, the microparticles within the population may have a relative standard deviation of aspect ratio in the range of about 5% to about 99%. For example, in one embodiment the microparticles within a population have a relative standard deviation of aspect ratio in the range of about 25% to about 75%, about 35% to about 75%, or even about 55% to about 65%.

Figure 1C:
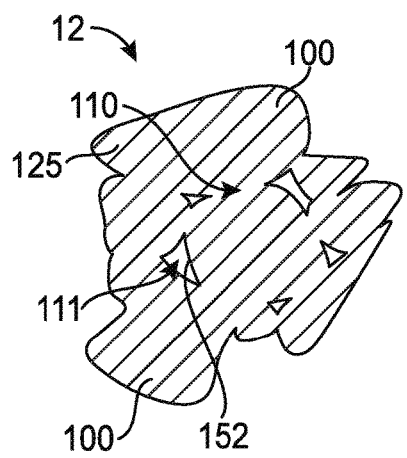
FIG. 1C is a schematic illustration of a template that may be used to prepare a monolithic porous open-cell structure of the present disclosure.
Figure 1D:
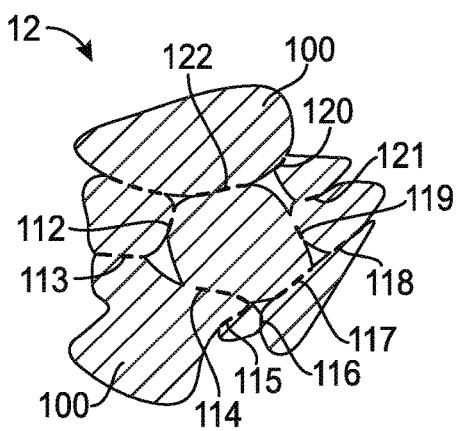
FIG. 1D is a schematic illustration of a template that may be used to prepare a monolithic porous open-cell structure of the present disclosure.
Figure 2:
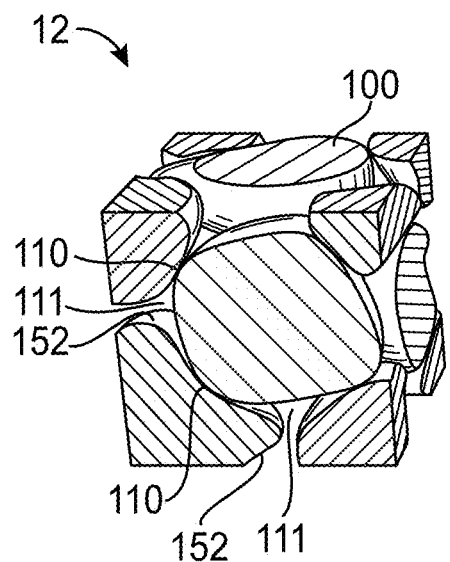
FIG. 2 is a schematic three-dimensional illustration of a cross-section of a template that may be used to prepare a monolithic porous open-cell structure of the present disclosure.

Referring now to FIGS. 1C and 2, the microparticulate mass (see FIG. 1A) is consolidated to form template 12 comprising a population of microparticles 100 comprising interstitial regions 111, interfacial regions 110 (individually identified as interfacial regions 112, 113, 114, 115, 116, 117, 118, 119, 120, 121 and 122 in FIG. 1D) in which adjacent microparticles are in contact and non-contacting surface regions 152 that (at least partially) surround and define interstitial regions 111. Consolidation increases the amount of contacting surface area between adjacent particles (i.e., the surface area collectively comprised by interfacial regions 110 in template 12 (FIG. 1D) exceeds the surface area collectively comprised by contacting surface regions 101 in microparticulate mass 10 (FIG. 1A)) and decreases the interstitial volume between adjacent microparticles (i.e., the interstitial volume collectively comprised by interstitial regions 111 in template 12 (FIG. 1D) is less than the interstitial volume collectively comprised by interstitial regions 153 (FIG. 1A)).

In certain embodiments, microparticulate mass 10 is compressed to consolidate the microparticulate mass to form template 12. In general, compression of the microparticulate mass tends to increase the interfacial regions between the particles as the mass is consolidated. If the applied pressure exceeds the yield strength of the particles, the particles plastically (permanently) deform and further increase the interfacial surface area between adjacent microparticles (i.e., the region where the surface of two particles are in contact with one another); for example, upon the application of a compressive force, contacting surface regions 101 (FIG. 1A) increase in size to form interfacial regions 110 (FIG. 1C; individually identified as regions 112-122 in FIG. 1D). In general, interfacial regions 110 cannot be readily accessed by a fluid (liquid or gas) whereas a large percentage of interstitial regions 110 are readily accessed by a fluid (liquid or gas).

In those embodiments in which the mass is consolidated by compression (pressing), the mass will generally comprise malleable or deformable microparticles. For example, many metals plastically deform under an applied load whereas certain ceramics may fracture. Accordingly, in one embodiment, the mass comprises plastically deformable microparticles containing aluminum, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, silicon, indium, an alloy of any of the aforementioned elements, an oxide thereof, a nitride thereof, a carbide thereof, a silicide thereof, a boride thereof, or a combination of any of the foregoing elements, oxides, nitrides, carbide, silicide, boride. Polymer particles can also plastically deform under an applied load. Accordingly, in one embodiment, the microparticulate mass comprises plastically deformable polymeric microparticles. For example, in one such embodiment the plastically deformable polymeric microparticles are selected from the group consisting of polystyrene, polymethylmethacrylate, polylactic acid, polyethylene, polyacrylic acid, polyglycolic acid, and the copolymers and polymer blends thereof.

In certain embodiments, microparticulate mass 10 is sintered to consolidate the mass. Similar to compression, sintering tends to increase the interfacial regions between the particles, with extent of the increase being at least, in part, a function of the sintering time and temperature. As a result of the sintering, atoms in adjacent microparticles diffuse across the boundaries of the microparticles, fusing the particles together and thereby increasing the interfacial surface area (i.e., the region where the surface of two particles are fused and/or otherwise in contact with one another) between the fused microparticles; for example, upon sintering, contacting surface regions 101 (FIG. 1A) increase in size to form interfacial regions 110 (FIG. 1C; individually identified as regions 112-122 in FIG. 1D). Additionally, and a result of the fusion of adjacent microparticles, sintering can produce a rigid body from the loose powders. Typically, sintering temperatures will be in the range of about 30-70% of the material melting temperature of the microparticles within microparticulate mass 10. In other embodiments, the sintering temperature will be in the range of about 70-80% of the melting temperature. In other embodiments, the sintering temperature will be in the range of about 80-90% of the melting temperature. In other embodiments, the sintering temperature will be as high as 99% of the melting temperature.

In certain embodiments, the microparticulate mass is consolidated by a combination of pressing (compression) and sintering. For example, in one embodiment a compressive force is applied to the microparticulate mass as it is being sintered. In another example, the microparticulate mass is pressed first, then sintered. In another example, the microparticulate mass is sintered first and then pressed.

As described in greater detail above, consolidation of the microparticulate mass (for example, by compression, sintering, or a combination of compression and sintering), enables contacting surface regions 101 (FIG. 1A) to increase in size to form interfacial regions 110 (FIG. 1C; individually identified as interfacial regions 112-122 in FIG. 1D) between adjacent microparticles. The size and overall shape of the interfacial regions after consolidation will depend, at least in part, upon the size and size distribution of the microparticle population used to form the microparticulate mass, and the compressive force and/or sintering time/temperature. In general, however, the interfacial regions may have an average size that is up to 99% of the average particle size. For example, in some embodiments the interfacial regions have an average size that is in the range of 20% to 99% of the average particle size of the microparticles comprised by the microparticulate mass. By way of further example, in some embodiments the interfacial regions have an average size that is in the range of 30% to 80% of the average particle size of the microparticles comprised by the microparticulate mass. By way of further example, in some embodiments the interfacial regions have an average size that is in the range of 40% to 70% of the average particle size of the microparticles comprised by the microparticulate mass. By way of further example, in some embodiments the interfacial regions have an average size that is in the range of 50% to 60% of the average particle size of the microparticles comprised by the microparticulate mass. In addition, in each of the foregoing embodiments, the relative standard deviation of the average size of the interfacial regions within the template may be less than 5%. In another embodiment, the relative standard deviation of the average size of the interfacial regions within the template may be in the range of about 5% to 99%. For example, in each of the foregoing embodiments, the average size of the interfacial regions within the template may be in the range of about 25% to 75%, about 35% to about 75%, or even about 55% to about 65%.

In general, however, the shape of the interfacial regions between individual microparticles in the template can be characterized by reference to the aspect ratio thereof. In one embodiment, the interfacial regions within a template will have an average aspect ratio of at least about 1:1. For example, in some embodiments the interfacial regions within a template have an average aspect ratio of at least about 1.25:1. By way of further example, in some embodiments the interfacial regions within a template have an average aspect ratio of at least about 1.5:1. By way of further example, in some embodiments the interfacial regions within a template have an average aspect ratio of at least about 2:1. By way of further example, in some embodiments the interfacial regions within a template have an average aspect ratio of at least about 3:1. By way of further example, in some embodiments the interfacial regions within a template have an average aspect ratio of at least about 4:1. By way of further example, in some embodiments the interfacial regions within a template have an average aspect ratio of at least about 5:1. In general, however, the interfacial regions within a template will typically have an average aspect ratio of less than about 10:1. Thus, in some embodiments the interfacial regions within a template have an average aspect ratio in the range of about 1:1 to about 10:1. By way of further example, in some embodiments the interfacial regions within a template have an average aspect ratio in the range of about 1:1 to about 5:1. By way of further example, in some embodiments the interfacial regions within a template have an average aspect ratio in the range of about 1:25 to about 3:1. By way of further example, in some embodiments the interfacial regions within a template have an average aspect ratio in the range of about 1:25 to about 2:1. In addition, in each of the foregoing embodiments, the relative standard deviation of the aspect ratios of the interfacial regions within the template may be less than 5%. Alternatively, the relative standard deviation of the average size of the interfacial regions within the template may be in the range of about 5% to 99%. For example, in each of the foregoing embodiments, the relative standard deviation of the aspect ratios of the interfacial regions within the template may be in the range of about 25% to 75%, about 35% to about 75%, or even about 55% to about 65%.

Figure 1E:
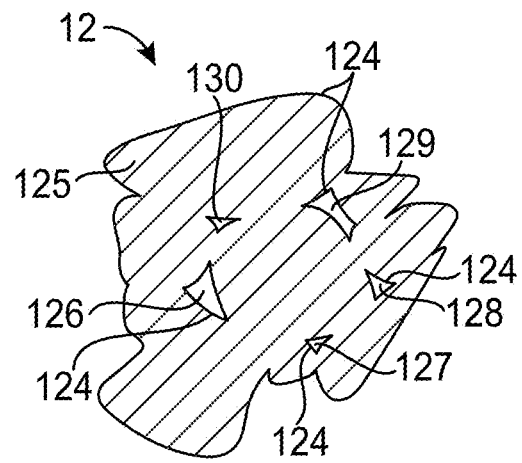
FIG. 1E is a schematic illustration of a template that may be used to prepare a monolithic porous open-cell structure of the present disclosure.

After the microparticulate mass is consolidated to form the template, the template it is infiltrated with a framework material. In one embodiment, the framework material is deposited on the surfaces of the microparticles within the template that are accessible to gases or liquids. Referring now to FIG. 1E, a layer of framework material 124 is deposited on the non-contacting surface regions of the consolidated mass 125 of microparticles comprised by the template. As illustrated, framework material 124 is deposited on the exposed outer surface of the consolidated mass and on the non-contacting surface regions defining interstitial regions 126, 127, 128, 129 and 130. Stated differently, the framework material is deposited on the outer surface and the internal surfaces of the pores of the template that are accessible to the framework material via the employed coating technique. A range of deposition techniques may be employed to deposit the framework material onto the template surfaces (external and internal pore surfaces). Exemplary techniques include electrodeposition, electroless deposition, sol-gel deposition, dip coating, spin coating, atomic layer deposition, chemical vapor deposition, and combinations thereof. In one embodiment, the framework material is conformally coated onto the template surfaces (external and internal pore surfaces) but the interstitial regions between the microparticles are not filled completely. In another embodiment, the framework material fills the interstitial regions between the microparticles.

The framework material may be selected from a wide range of materials, depending upon the intended end use of the resulting porous structure left behind after the template is removed. For example, the framework material may comprise a metal, a metal alloy, a ceramic, an oxide, a nitride, a silicide, a boride, a carbide, carbon (including all of the allotropes thereof), a Group IV semiconductor material, a compound semiconductor material, or a polymer. For example, the framework material may comprise aluminum, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, silicon, indium, an alloy of any of the aforementioned elements, an oxide thereof, a nitride thereof, a carbide thereof, a silicide thereof, a boride thereof, or a combination of any of the foregoing elements, oxides, nitrides, carbide, silicide, boride. In one embodiment, the framework material comprises a semiconductor such as silicon (Si), cadmium sulfide (CdS), cadmium selenide (CdSe), zinc oxide (ZnO), or copper(I) oxide or cuprous oxide ($Cu_2O$). Additionally, multiple layers of a framework material may be deposited on or in the template. For example, in one embodiment multiple layers of different framework materials are deposited. In another embodiment, multiple layers of the same framework material is deposited. By way of further example, in one embodiment the final monolithic porous, open-cell structure is for use in a battery and is electrically conductive. Even in this embodiment, however, the deposited framework material need not be conductive to make a structure useful for battery applications. The deposited framework material may, for example, comprise a material that can be converted to a conducting material with an additional processing step (e.g., a polymer that can be carbonized). The deposited framework material may also serve as a scaffold, seed layer, or supporting layer for the subsequent deposition step of a conductive material.

In one embodiment, the template is infiltrated multiple times with one or more framework materials (which may be the same or different framework materials) to deposit multiple layers of framework material onto and/or into the template. Thus, for example, the template may be infiltrated in a series of infiltration steps with a series of different framework materials. By way of further example, the template may be infiltrated in a series of infiltration steps with the same framework material. By way of further example, the template may be infiltrated in a series of steps wherein the same material is deposited in two or more of the series of infiltration steps and a compositionally distinct framework material is deposited in at least one of the series of infiltration steps. Advantageously, the use of multiple infiltration steps with compositionally distinct framework material(s) facilitates the tailoring of the framework material for a range of applications. For example, in one such embodiment the template is infiltrated in one of the series of infiltration steps with a first framework material that is the same (or approximately the same) composition as the microparticles (comprised by the template) and a second, compositionally distinct framework material is deposited in another of the series of infiltration steps; as a result, in this embodiment, the first framework material may be removed under substantially the same conditions as the template (e.g., the first framework material functions as a sacrificial material that partially fills the interstitial regions of the template). By way of further example, in another such embodiment the template is infiltrated with a first framework material that is compositionally distinct from the microparticles (comprised by the template) and a second framework material that is deposited in a separate infiltration step that is compositionally distinct from the microparticles (comprised by the template) and the first framework material; in this embodiment, the first framework material may optionally have the capacity to be removed under substantially the same conditions as the template whereas the second framework material will not be removed under such conditions.

Figure 1F:
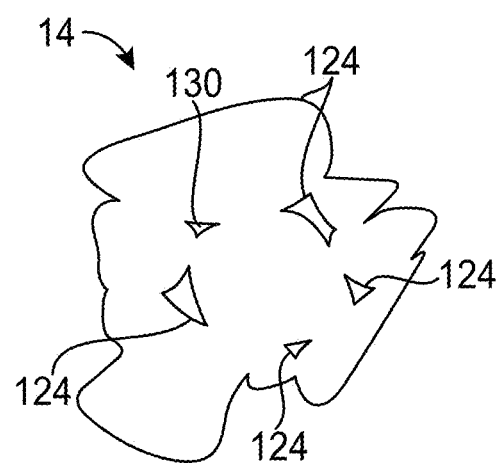
FIG. 1F is a schematic illustration of a monolithic porous open-cell structure of the present disclosure.
Figure 3:
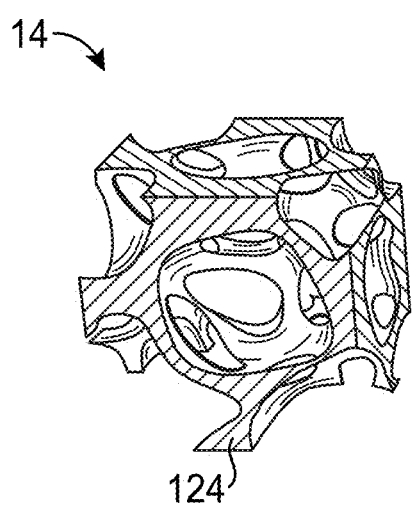
FIG. 3 is a schematic three-dimensional illustration of a cross-section of a monolithic porous open-cell structure of the present disclosure.

Referring now to FIGS. 1F and 3, after the template is infiltrated with the framework material, the template is removed to provide a monolithic porous structure 14 comprising framework material 124. In one embodiment, the monolithic porous structure comprises unit cells defined by framework material 124, interconnectivity windows between adjacent unit cells, interstitial volume. The shape, average size and shape and size distribution of the unit cells generally corresponds to the inverse of the interstitial (void) volume of the template. Taking into account the composition of the microparticles consolidated to form the template and the composition of the framework material, a wide range of techniques may be used to remove the template without negatively impacting the composition of the framework material or the three-dimensional porous structure left behind. For example, template removal can be accomplished using one of the following processes: de-alloying, electrochemical etching, wet chemical etching, reactive ion etching, chemical dissolution, thermal decomposition, or a combination thereof.

Figure 4:
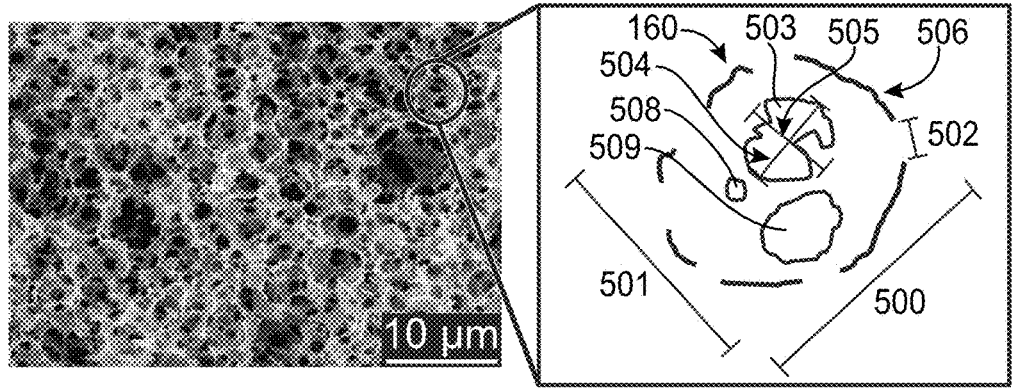
FIG. 4 is an annotated schematic of the fracture cross-section of the SEM of FIG. 11B, annotated to identify a unit cell and interconnectivity windows thereof.
Figure 5:
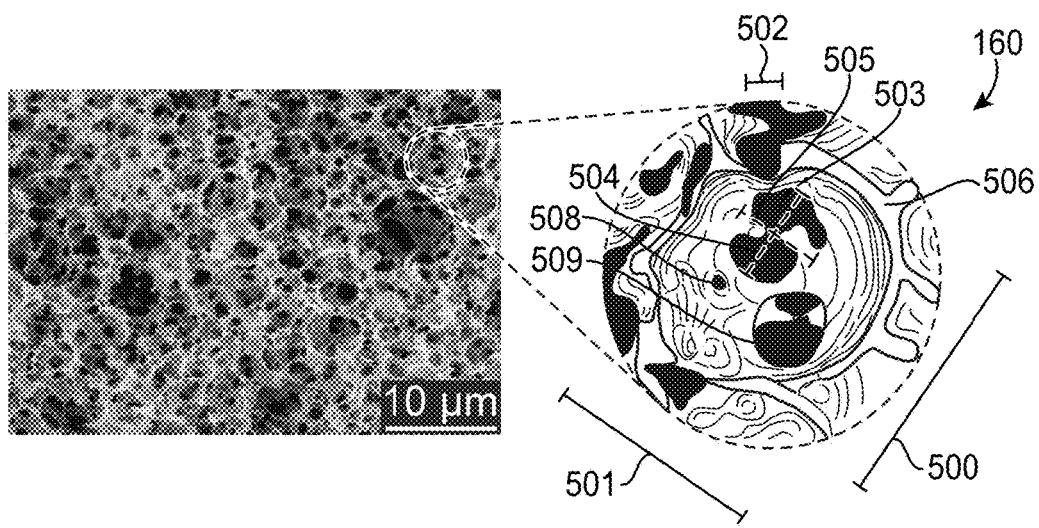
FIG. 5 is an annotated three-dimensional schematic of the fracture cross-section of the SEM of FIG. 11B, annotated to identify a unit cell and interconnectivity windows thereof.

Referring now to FIGS. 4 and 5, a schematic depiction of a representative unit cell of a monolithic porous structure comprising a framework material and prepared as described in Example 1 is illustrated. Unit cell 160 has outline 506 (traced by framework material) and interconnectivity window 503. Unit cell 160 has a size that corresponds to dimension 500 (the largest dimension of the unit cell in this representative cross-section of the depicted monolithic porous structure) and an aspect ratio that corresponds to the ratio of dimension 500 to dimension 501 (the dimension that is orthogonal to dimension 500). Interconnectivity window 503 has a size that corresponds to dimension 504 (the largest dimension of interconnectivity window 503 in this representative cross-section of the depicted monolithic porous structure) and an aspect ratio that corresponds to the ratio of dimension 504 to dimension 505 (the dimension that is orthogonal to dimension 504). In addition to interconnectivity window 503, the illustrated unit cell contains interconnectivity windows 508, 509 surrounded by and within border 506 of the unit cell, and additional interconnectivity windows 502 interrupting the border of the unit cell as depicted in this cross-sectional view.

In some embodiments, the monolithic porous structure has a void volume fraction (porosity) of at least about 25%. For example, in one embodiment the structure has a void volume fraction (i.e., porosity) of at least about 35%. By way of further example, in one embodiment the monolithic porous structure has a void volume fraction (porosity) of at least about 50%. By way of further example, in one embodiment the monolithic porous structure has a void volume fraction (porosity) of at least about 60%. By way of further example, in one embodiment the structure has a void volume fraction (porosity) of at least about 75%. By way of further example, in one embodiment the monolithic porous structure has a void volume fraction (porosity) of at least about 90%. By way of further example, in one embodiment the monolithic porous structure has a void volume fraction (porosity) of at least about 95%. By way of further example, in one embodiment the monolithic porous structure has a void volume fraction (porosity) of at least about 99%.

For embodiments where the template is conformally coated with a framework material, the average wall thickness and the thickness variation of the wall thickness of the framework material throughout the skeletal network is a function of a number of factors including, for example, the size and size distribution of the microparticles used to form the template, the shape and variation in shape of the microparticles used to form the template, the degree of consolidation (compression and/or sintering), the coating technique used to infiltrate the template with framework material and the amount of framework material infiltrated into the template. The thickness of the framework is determined by measuring the distance perpendicular from the template/framework material interface to the terminal surface. In certain embodiments, the thickness of the coating will vary no more than 50% from the average thickness. For example, in some applications the thickness variation will be less than 20% of the average thickness. By way of further example, in some applications the thickness variation will be less than 10% of the average thickness.

In one exemplary embodiment, the unit cells have an average size in the range of about 10 nm to about 100 μm. For example, in one such embodiment the unit cells have an average size in the range of about 10 nm to 50 μm. By way of further example, in one such embodiment the unit cells have an average size in the range of about 10 nm to about 25 µm. By way of further example, in one such embodiment the unit cells have an average size in the range of about 10 nm to about 10 µm. By way of further example, in one such embodiment the unit cells have an average size in the range of about 100 nm to about 10 µm. By way of further example, in one such embodiment the unit cells have an average size in the range of about 100 nm to about 5 µm. By way of further example, in one such embodiment the unit cells have an average size in the range of about 0.2 µm to about 2 µm. By way of further example, in one such embodiment the unit cells have an average size in the range of about 0.4 µm to about 2 µm. By way of further example, in one such embodiment the unit cells have an average size in the range of about 0.5 µm to about 1.5 µm.

In one embodiment, the relative standard deviation of the average unit cell size may be less than 5%, greater than 5% and in other embodiments as great as 99%. In certain embodiments, the relative standard deviation may be in the range of about 25% to about 75%. By way of further example, in one embodiment the relative standard deviation may be in the range of about 35% to about 75%. By way of further example, in one embodiment, the relative standard deviation may be in the range of about 55% to about 65%. In each of these embodiments, the relative standard deviation may be for a population of unit cells having an average unit cell size in the range of 100 nm to 100 µm, 0.1 µm to 10 µm, 0.2 µm to 2 µm, 0.4 µm to 2 µm or even 0.5 µm to 1.5 µm.

In one embodiment the unit cells have an average aspect ratio of about 1:1 to about 10:1. By way of further example, in one embodiment the unit cells have an average aspect ratio of about 1:1 to about 5:1. By way of further example, in one embodiment the unit cells have an average aspect ratio of about 1:1 to about 4:1. By way of further example, in one embodiment the unit cells have an average aspect ratio of about 1:1 to about 3:1. By way of further example, in one embodiment the unit cells have an average aspect ratio of about 1:1 to about 2:1. By way of further example, in one embodiment the unit cells have an average aspect ratio of about 1:1 to about 1.5:1. In one such embodiment, the unit cells may have a relative standard deviation of aspect ratio of less than 5%. In another embodiment, the unit cells may have a relative standard deviation of aspect ratio in the range of about 5% to about 99%. For example, in one embodiment the unit cells within a population have a relative standard deviation of aspect ratio in the range of about 25% to about 75%, about 35% to about 75%, or even about 55% to about 65%.

Similarly, the size and size distribution of the interconnectivity windows between the unit cells generally corresponds to the size and size distribution of the contacting regions between adjacent microparticles in the template. In general, however, the interconnectivity windows may have an average size that is up to 99% of the average unit cell size. For example, in some embodiments the interconnectivity windows have an average size that is in the range of 20% to 99% of the average the unit cell size. By way of further example, in some embodiments the interconnectivity windows have an average size that is in the range of 30% to 80% of the average unit cell size. By way of further example, in some embodiments the interconnectivity windows have an average size that is in the range of 40% to 70% of the average unit cell size. By way of further example, in some embodiments the interconnectivity windows have an average size that is in the range of 50% to 60% of the average unit cell size. In addition, in each of the foregoing embodiments, the relative standard deviation of the average size of the interconnectivity windows within the porous structure may be less than 5%. In another embodiment, the relative standard deviation of the average size of the interconnectivity windows may be in the range of about 5% to 99%. For example, in each of the foregoing embodiments, the average size of the interconnectivity windows within the porous structure may be in the range of about 25% to 75%, about 35% to about 75%, or even about 55% to about 65%.

In general, however, the shape of the interconnectivity windows between unit cells in the porous structure can be characterized by reference to the aspect ratio thereof. In one embodiment, the interconnectivity windows within a porous structure will have an average aspect ratio of at least about 1:1. For example, in some embodiments the interconnectivity windows within a porous structure have an average aspect ratio of at least about 1.25:1. By way of further example, in some embodiments the interconnectivity windows within a porous structure have an average aspect ratio of at least about 1.5:1. By way of further example, in some embodiments the interconnectivity windows within a porous structure have an average aspect ratio of at least about 2:1. By way of further example, in some embodiments the interconnectivity windows within a porous structure have an average aspect ratio of at least about 3:1. By way of further example, in some embodiments the interconnectivity windows within a porous structure have an average aspect ratio of at least about 4:1. By way of further example, in some embodiments the interconnectivity windows within a porous structure have an average aspect ratio of at least about 5:1. In general, however, the interconnectivity windows within a porous structure will typically have an average aspect ratio of less than about 10:1. Thus, in some embodiments the interconnectivity windows within a porous structure have an average aspect ratio in the range of about 1:1 to about 10:1. By way of further example, in some embodiments the interconnectivity windows within a porous structure have an average aspect ratio in the range of about 1:1 to about 5:1. By way of further example, in some embodiments the interconnectivity windows within a porous structure have an average aspect ratio in the range of about 1:25 to about 3:1. By way of further example, in some embodiments the interconnectivity windows within a porous structure have an average aspect ratio in the range of about 1:25 to about 2:1. In addition, in each of the foregoing embodiments, the relative standard deviation of the aspect ratios of the interconnectivity windows within the porous structure may be less than 5%. Alternatively, the relative standard deviation of the aspect ratios of the interconnectivity windows within the porous structure may be in the range of about 5% to 99%. For example, in each of the foregoing embodiments, the relative standard deviation of the aspect ratios of the interconnectivity windows within the porous structure may be in the range of about 25% to 75%, about 35% to about 75%, or even about 55% to about 65%.

The monolithic porous open-cell structure may be transformed by chemical reaction, for example a metal may be treated with oxygen to form a monolithic porous structure containing the corresponding oxide, or treated with sulfur (e.g., $H_2S$) or a halogen to form a monolithic porous structure of the corresponding sulfide or halide. In addition, once formed the monolithic porous structure may be conformally coated. Processes such as chemical vapor deposition, chemical vapor infiltration, atomic layer deposition, sol-gel, dip coating, spin coating, drop casting, and electrodeposition are examples of useful processes that can be tailored to deposit a material on all surfaces within the structure without closing cells. For example, a monolithic porous structure may be coated with $Al_2O_3$, $HfO_2$, $ZrO_2$, $SiO_2$ and/or $TiO_2$. By way of further example, the framework material may be electrochemically oxidized (anodized) resulting in the conversion the material to the corresponding oxide of that material. This conversion process begins at the surface of the skeletal network of framework material (all surfaces exposed to the anodizing solution). The magnitude of the applied voltage determines the thickness of the converted layer.

For battery applications, the monolithic porous open cell structure may be coated with an electrochemically active material suitable for use as an anode or a cathode in a battery. In general, a conformal deposition technique is typically preferred to deposit a material that is electrochemically active on the monolithic porous open cell structure without closing the open cells. Processes such as chemical vapor deposition, chemical vapor infiltration, atomic layer deposition, sol-gel, dip coating, spin coating, drop casting, and electrodeposition are examples of useful processes that can be tailored to deposit a material on all surfaces within the structure without closing cells. Any battery chemistry can utilize these monolithic porous open cell structures in accordance with this embodiment provided it is conformally deposited on all surfaces within the structure. Typically, at least 75% of all available surfaces will be covered with the active material (excluding tab region). By way of further example, at least 90% of all available surfaces (excluding the tab region) will be covered with the active material. By way of further example, at least 95% of all available surfaces (excluding tab regions) will be covered with the active material. By way of further example, at least 98% of all available surfaces (excluding tab regions) will be covered with the active material. By way of further example, at least 99% of all available surfaces (excluding tab regions) will be covered with the active material. A small, uncoated area of the monolithic porous open-cell structure is used to create a contact to the external circuit during operation.

The monolithic porous open cell structure may be used for any primary battery or secondary battery. Furthermore, the structure could be used for any battery chemistries with the only requirement being that the battery active materials coat without closing the open cells of the structure. For example, the structure may be used, for any of the following types of batteries: lithium-ion, alkaline, nickel-zinc, aluminum-ion, magnesium-ion battery, calcium-ion, metal-air, nickel metal hydride, nickel-cadmium. In one embodiment, the electrochemically active material is an electrochemically active organic material such as polypyrrole, polyaniline, and polyazulene, a transition metal oxide, mixed transition metal oxide, a lithiated transition metal oxide or a lithiated mixed transition metal oxide. If applied as a cathode, the electrochemically active material coated onto the structure could include: lithiated manganese oxide, lithiated cobalt oxide, vanadium oxide, mixed metal oxides, nickel oxyhydroxide, manganese dioxide. If applied as an anode, the electrochemically active material could include: carbon (all allotropes), sulfur, tin, nickel, zinc, aluminum, silicon, lithium titanate, lithium, metal hydride, calcium, cadmium, magnesium lithium, or an alloy thereof. In each of the foregoing embodiments, the thickness of the electrochemically active material. coating on the structure should be less than half the average interconnectivity window size. Thus, if the active material coating thickness is always less than half of the interconnectivity window size, the pore cannot be closed. Conversely, if the pores have a broad size distribution within the open cell porous structure and the thickness of the active material is chosen to be half of the average unit cell size, then some of the smaller pores will be closed. This is acceptable, however no more than 75% of the interconnectivity windows can be closed and more ideally not more than 50% of the interconnectivity windows can be closed. By way of further example, no more than 25% of the interconnectivity windows can be closed.

Additionally, the thickness of the deposited coating may vary somewhat within the three-dimensional working electrode but in some embodiments it is generally preferred that the thickness variation be too substantial. For example, in some embodiments the thickness of the coating at any given area within the working electrode (measured in a direction that is perpendicular to the interface between the coating and the surface of the working electrode to the terminal edge of the coating). For battery applications, this thickness will typically be in the range of about 1 nm to about 50 µm. More typically, the thickness will be in the range of about 100 nm to about 10 µm. In certain of these embodiments, the thickness of the coating will vary no more than 50% from the average thickness. For example, in some applications the thickness variation will be less than 20% of the average thickness. By way of further example, in some applications the thickness variation will be less than 10% of the average thickness.

After the coating is deposited on the framework material, the monolithic porous open-cell structure may have a void volume fraction of about 5% to about 60%. For example, in one embodiment the structure has a void volume fraction (porosity) of at least about 10%. By way of further example, in one embodiment the structure has a void volume fraction (porosity) of at least about 20%. By way of further example, in one embodiment the structure has a void volume fraction (porosity) of at least about 30%. By way of further example, in one embodiment the structure has a void volume fraction (porosity) in the range of about 10% to about 55%. By way of further example, in one embodiment the structure has a void volume fraction (porosity) in the range of about 20% to about 45%. By way of further example, in one embodiment the structure has a void volume fraction (porosity) in the range of about 25% to about 35%.

In those embodiments in which the monolithic porous structure is adapted or intended for use in a primary or secondary battery, the monolithic porous open cell structure may comprise an electrically conductive material skeletal network of framework material and function as a porous current collector for the electrode. Exemplary conductive materials include aluminum, carbon, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, indium, an alloy of any of the aforementioned elements, a conductive oxide thereof, a conductive nitride thereof, a conductive carbide thereof, a conductive silicide thereof, a conductive boride thereof, or a conductive combination of any of the foregoing elements, oxides, nitrides, carbide, silicide, boride. The integrated conductive network (electrochemically active material on an electrically conductive monolithic porous open cell structure) enables fast electron transport in the battery electrode (cathode or anode).

Some primary and secondary battery applications would benefit from a flexible anode, cathode or even a flexible battery. Advantageously, the process of the present disclosure may be used to prepare such flexible materials. For example, in one embodiment, a composite of the monolithic porous open cell structure having an electrochemically active coating thereon (anodically active or cathodically active) has a flexibility characterized by an electrochemical capacity retention of at least 80% even after repeated bending of the composite to a radius of curvature of 100 mm, 75 mm, 50 mm, 25 mm, 10 mm, or even 7 mm over at least 300 bending cycles (i.e., each cycle involving a bending step and then returning the bent composite to its original shape), at least 500 bending cycles, at least 1,000 bending cycles, at least 2,000 bending cycles, or even at least 3,000 bending cycles. For example, in one embodiment a composite of the monolithic porous open cell structure having an electrochemically active coating thereon has a flexibility characterized by an electrochemical capacity retention of at least 80% even after bending the composite to a radius of curvature of 25 mm over at least 300 bending cycles, at least 500 bending cycles, at least 1,000 bending cycles, at least 2,000 bending cycles, or even at least 3,000 bending cycles. By way of further example, in one such embodiment a composite of the monolithic porous open cell structure having an electrochemically active coating thereon has a flexibility characterized by an electrochemical capacity retention of at least 80% even after bending the composite to a radius of curvature of 10 mm over at least 300 bending cycles, at least 500 bending cycles, at least 1,000 bending cycles, at least 2,000 bending cycles, or even at least 3,000 bending cycles. By way of further example, in one such embodiment the working electrode/deposited coating composite has a flexibility characterized by an electrochemical capacity retention of at least 80% even after bending the composite to a radius of curvature of 7 mm over at least 300 bending cycles, at least 500 bending cycles, at least 1,000 bending cycles, at least 2,000 bending cycles, or even at least 3,000 bending cycles.

Monolithic, highly porous, open-cell structures comprising carbon can serve as a conductive scaffold for an electrochemically active material, or can be the electrochemically active material and the conductive scaffold, or can be coated onto a framework material that is more conductive than the carbon. For example, carbon, is an electrochemically active anode material for lithium ion batteries. Monolithic highly porous open cell structures comprising carbon can be fabricated using the template described in this disclosure. The templates are infiltrated with a polymeric material that can be carbonized in inert atmospheres and at elevated temperatures (~500° C.) and graphitized at even greater temperatures. For example, in one embodiment the polymeric material is selected from the group consisting of polyacrylonitrile, pitch, polyfurfuryl alcohol, phenolic resin, polyethylene, polyresorcinol, and polyacrylic acid, polyvinyl alcohol, polymethylmethacrylate, and the copolymers and blends thereof. Typically the polymer is infiltrated into the template. The infiltrated template is annealed to 500° C. in argon for 2 hours. This carbonizes the polymer. Next, the template is removed revealing a monolithic, porous open cell structure. Finally, the porous structure is annealed to at least 1000° C. to enhance the conductivity of the carbon. The carbon comprising the porous structure can be graphitized by annealing to 2000° C. or greater in inert atmospheres, depending on the chosen polymer precursor.

Using the disclosed process, the final monolithic porous, open-cell, structures have the same dimensions as the template. For example, in some embodiments, the monolithic porous open-cell structure has a thickness of at least 1 μm. By way of further example, in some embodiments the monolithic porous open-cell structure has a thickness of at least 10 μm. By way of further example, in some embodiments the monolithic porous open-cell structure has a thickness of at least 50 μm. By way of further example, in some embodiments the monolithic porous open-cell structure has a thickness of at least 100 μm. By way of further example, in some embodiments the monolithic porous open-cell structure has a thickness of at least 200 μm. By way of further example, in some embodiments the monolithic porous open-cell structure has a thickness of at least 500 μm. By way of further example, in some embodiments the monolithic porous open-cell structure has a thickness of at least 750 μm. By way of further example, in some embodiments the monolithic porous open-cell structure has a thickness of at least 1 mm. By way of further example, in some embodiments the monolithic porous open-cell structure has a thickness of at least 2 mm. By way of further example, in some embodiments the monolithic porous open-cell structure has a thickness of at least 3 mm. By way of further example, in some embodiments the monolithic porous open-cell structure has a thickness of at least 4 mm. By way of further example, in some embodiments the monolithic porous open-cell structure has a thickness of at least 5 mm. Commonly, the length and width of the monolithic porous, open-cell, conductive structures are macroscopic and the thickness is microscopic (500 μm or less). In one embodiment, in each of the foregoing exemplary embodiments, the thickness dimension is the smallest dimension. Other geometries are desirable for various applications and could be realized using the processes invented. Injection molding or other types of molding or extrusion processes, for example, could be readily used to fabricate templates with more complex geometries where all three dimensions are on the same length scale (i.e. all three dimensions are macroscopic). The geometry could take any arbitrary form desired for a given application. In this embodiment, the template is near the net shape of the final monolithic, porous, open-cell structure for a given application. If the template is inverted to carbon by way of a polymeric precursor, then the final monolithic, porous, open-cell structure will have smaller dimensions than the template. This is because the polymer shrinks as it is carbonized and carbon shrinks further as it is graphitized.

Figure 6A:
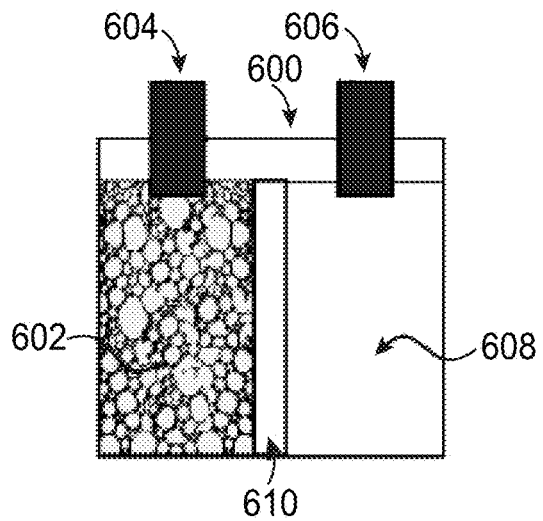
FIG. 6A is a schematic illustration of an alternative embodiment of a battery comprising a porous structure of present disclosure.

Referring now to FIG. 6A, a battery typically comprises package 600, cathode 602, tabs 604 and 606, an anode 608, separator/solid polymer electrolyte 610, and electrolyte (not shown). In accordance with present disclosure, the anode, the cathode or both the anode and the cathode comprise a monolithic porous structure prepared as described herein. In one embodiment, one of the electrodes (the anode or the cathode) comprises a monolithic porous structure prepared as described herein and the other electrode (i.e., the counter-electrode) is prepared using any currently available techniques. In another embodiment, each of the electrodes (the anode and the cathode) comprises a monolithic porous structure prepared as described herein.

Separator/solid polymer electrolyte 610 between the cathode 602 and the anode 608 serves as a physical barrier between the two electrodes so that neither electrode is electronically connected within the cell. Separator/solid polymer electrolyte 610 may comprise any of the materials conventionally used as secondary battery separators including, for example, microporous polyethylenes, polypropylenes, $TiO_2$, $SiO_2$, $Al_2O_3$, and the like (P. Arora and J. Zhang, "Battery Separators" Chemical Reviews 2004, 104, 4419-4462). Alternatively, separator/solid polymer electrolyte 610 may comprise a conventional solid polymer electrolyte. A gelled electrolyte (mixture of liquid and solid) may also be provided. In any of the foregoing embodiments, separator/ solid polymer electrolyte 610 comprises an electrolyte with a lithium or other carrier ion.

Tabs 604, 606 may comprise any of a range of electrically conductive materials that are chemically compatible for connection to a battery cathode or anode, respectively. For example, tab 604 may comprise aluminum and tab 606 may comprise copper. In those embodiments in which the electrode (anode or cathode) comprises a monolithic porous open-cell structure of the present disclosure, the tab is attached to the porous open-cell structure before the battery active material is deposited onto the structure. The tab may be connected to the porous structure using a welding technique such as spot welding or ultra-sonic welding and then sealed inside the packaging 600.

Figure 6B:
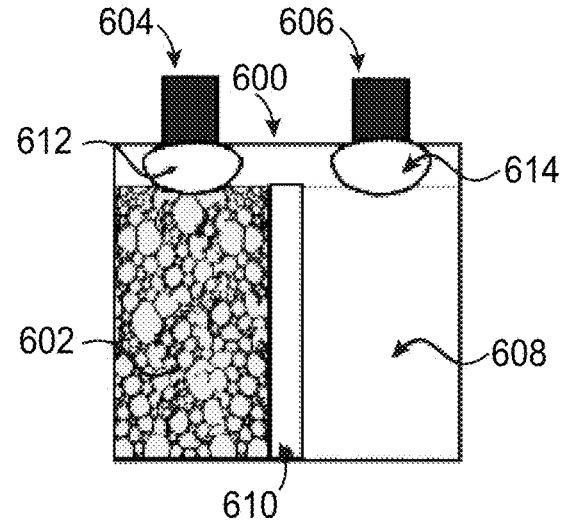
FIG. 6B is a schematic illustration of an alternative embodiment of a battery comprising a porous structure of present disclosure.
Figure 6C:
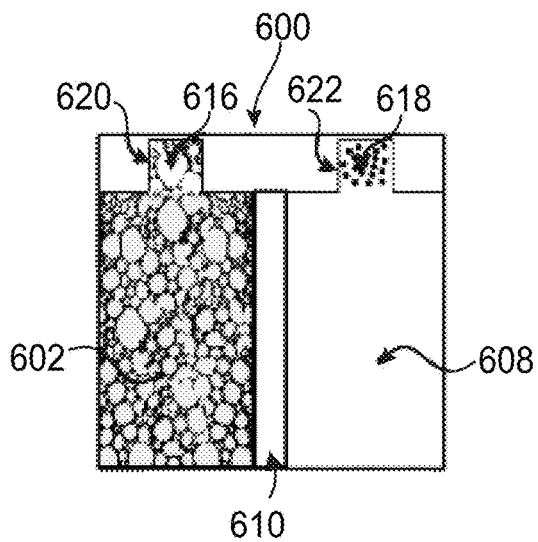
FIG. 6C is a schematic illustration of an alternative embodiment of a battery comprising a porous structure of present disclosure.

In certain embodiments in which the battery comprises a liquid, non-aqueous electrolyte, and the tab is attached to a metal comprised by the electrode that differs from the metal comprised by the tab, it may be desirable to electrically isolate the tab from the electrolyte to inhibit potential long-term galvanic corrosion. One method to isolate the tab from the electrolyte involves encapsulating the region where the tab and electrolyte are in physical contact (regions 612 and 614 in FIG. 6B) with an inert, stable, polymer such as polyester, polyethylene. To increase the contact area between the electrode and the tab, it may be desirable to infill the porous open cell structure with conductive materials (616 and 618), only in the regions (620 and 622) of the tabs in FIG. 6C. The regions 620 and 622 in FIG. 6C were welded with the Tab 604 and 606. The conductive filler materials 616 and 618 need not be the same material as the tabs or the same material as the porous open cell structure. This conductive filler materials 616 and 618 can be deposited by processes such as chemical vapor deposition, atomic layer deposition, physical vapor deposition, electrodeposition, electroless deposition, nanoparticle infilling, dip coating, or sol gel deposition. If any of the three conductive materials are different, the tabbing region (612 and 614) must be isolated from the liquid electrolyte to prevent galvanic corrosion. The packaging would then be sealed around the tab and the protruding region of the tab would be used to connect to an electronic circuit.

Figure 6D:
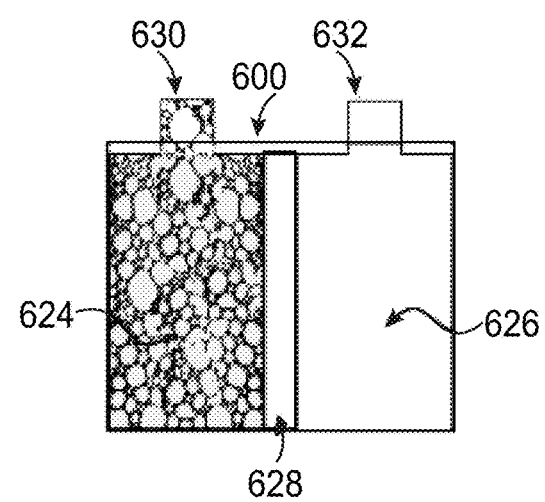
FIG. 6D is a schematic illustration of an alternative embodiment of a battery comprising a porous structure of present disclosure.

Alternatively, and referring now to FIG. 6D in one embodiment a battery comprising a cathode 624, an anode 626, and separator/solid polymer electrolyte 628 (as described in connection with FIGS. 6A-6D) may be assembled without a tab formed from a dissimilar material. In this embodiment, a small protruding region (630 and/or 632) of the electrode (cathode 624 or anode 626) extends out of the battery package (600). The region protruding from the packaging, however, would not be coated with active material (anodically active material or cathodically active material). This non-coated region can be accomplished by a number of methods including, for example: (1) masking this region during the active material deposition, or (2) selectively removing active material from this region. The packaging would seal around the porous open cell structure, however, the open cell structure would not be sealed. Thus, an inert, stable polymer has to be in-filled into the porous open cell structure to complete the seal. The polymer infilling can occur before, after or during sealing around the structure. In this embodiment, a conductive filler can be added to the protruding region to help stabilize the region. The electronic circuit can be directly connected to the protruding region.

Alternatively, if the particle template for the fabrication of monolithic, highly porous, open cell structures, comprises the desired material for the tab, then the template may not be removed in a small region to serve as a tab for the electrode. For example, if copper is used as a template and nickel is coated within the interstitial region of the copper template, then the copper could be etched away from the highly porous open cell nickel structure in all areas except a small region, probably at the edge or corner of the electrode. This region would then consist of copper surrounded by nickel whereas the rest of the electrode would comprise the highly porous open cell nickel structure. In this example, if the template material is conductive and differs from the material comprising the porous open cell structure, and this region is sealed within the packaging, this region will need to be physically isolated from the electrolyte to prevent galvanic corrosion.

In some embodiments, a reinforcing phase is introduced into the monolithic porous, open-cell structures to enhance the mechanical stability of the structure. This reinforcing phase is typically introduced by incorporating a reinforcing material into the interstitial regions of the template. The reinforcing material may comprise: carbon nanotubes, graphene, carbon fibers, metal fibers, ceramic fibers, polymer fibers, or a combination thereof. The reinforcing material can be introduced during or after template formation. For example, to make a template comprising copper particles with carbon nanotubes as the reinforcing material, the copper particles are mixed with the carbon nanotubes in solution and then tape cast, drop cast, or spin cast onto a substrate. In this embodiment, template formation is complete after sintering or pressing the dried mixture of copper and carbon nanotubes. The template then comprises interconnected copper particles with carbon nanotubes in the interstitial regions of the template. Alternatively, the carbon nanotubes could be introduced into the template following the pressing and/or sintering steps. In this case, the carbon nanotubes are dispersed in a solution and subsequently infiltrated into the template by dip coating, spin coating or drop casting. After forming the template comprising the reinforcing material, the template is infiltrated with a material that encapsulates the reinforcing phase. Next, the template is removed, revealing the monolithic, porous, open-cell structure with a reinforcing phase. In one embodiment, the reinforcing phase is preferably not susceptible to damage, etching, or removal during template removal.

As previously discussed, the unit cell size and distribution of cell size in the monolithic porous open-cell structure is a function of the particle size and particle size distribution in the template. Accordingly, in one alternative embodiment the monolithic porous open-cell structure may have a non-uniform unit cell size distribution as a function of a height or thickness dimension. For example, in one embodiment the ratio of the average unit cell size in the bottom one-half of the monolithic structure to the average particle size in the top one-half of the monolithic structure is at least 1.1:1, respectively. By way of further example, in one embodiment the ratio of the average unit cell size in the bottom one-half of the monolithic structure to the average particle size in the top one-half of the monolithic structure is at least 2:1, respectively. By way of further example, in one embodiment the ratio of the average unit cell size in the bottom one-half of the monolithic structure to the average particle size in the top one-half of the monolithic structure is at least 3:1, respectively. By way of further example, in one embodiment the ratio of the average unit cell size in the bottom one-half of the monolithic structure to the average particle size in the top one-half of the monolithic structure is at least 4:1, respectively. By way of further example, in one embodiment the ratio of the average unit cell size in the bottom one-half of the monolithic structure to the average particle size in the top one-half of the monolithic structure is at least 5:1, respectively. By way of further example, in one embodiment the ratio of the average unit cell size in the bottom one-half of the monolithic structure to the average particle size in the top one-half of the monolithic structure is at least 7.5:1. By way of further example, in one embodiment the ratio of the average unit cell size in the bottom half of the monolithic structure to the average particle size in the top one-half of the monolithic structure is at least 10:1. Such structures may offer particular advantages when incorporated into an electrode of a battery as previously described herein.

The present disclosure further includes the following enumerated embodiments.

Embodiment 1. A process for the preparation of a monolithic porous open-cell structure, the process comprising
forming a mass of microparticles to form a template, the template comprising microparticles and interstitial volume between the microparticles within the mass, the surfaces of the microparticles within the template having contacting surface regions that contact the surfaces of other microparticles within the mass and non-contacting surface regions bounding the interstitial volume,
consolidating the mass of microparticles to form a template wherein consolidating comprises compressing or sintering the mass of microparticles,
infiltrating the template with a framework material that coats the non-contacting surface regions of the microparticles, and
removing the template to form a monolithic porous open-cell structure comprising a skeletal network comprising the framework material and having a void volume fraction of at least 25%.

Embodiment 2. The process of Embodiment 1 wherein the mass comprises plastically deformable microparticles, consolidating the mass of microparticles to form the template comprises compressing the mass of microparticles and the plastically deformable microparticles are plastically deformed during the consolidating step.

Embodiment 3. The process of Embodiment 1 or 2 wherein consolidating the mass of microparticles to form the template comprises sintering the mass of microparticles.

Embodiment 4. The process of any of Embodiments 1 to 3 wherein the template is removed by de-alloying, electrochemical etching, wet chemical etching, reactive ion etching, chemical dissolution, thermal decomposition, or a combination thereof.

Embodiment 5. The process of any of Embodiments 1 to 4 wherein the framework material is electrochemically oxidized (anodized) after the template is removed.

Embodiment 6. The process of any of Embodiments 1 to 4 wherein the framework material is converted to the corresponding oxide or sulfide after the template is removed.

Embodiment 7. The process of any of Embodiments 1 to 4 wherein the framework material is conformally coated after the template is removed.

Embodiment 8. The process of Embodiment 7 wherein the framework material is conformally coated by chemical vapor deposition, chemical vapor infiltration, atomic layer deposition, sol-gel, dip coating, spin coating, drop casting, or electrodeposition.

Embodiment 9. The process of Embodiment 7 or 8 wherein the framework material is conformally coated with $Al_2O_3$, $HfO_2$, $ZrO_2$, $SiO_2$ and/or $TiO_2$ Embodiment 10. The process of any of the preceding enumerated Embodiments wherein the monolithic porous open-cell structure is conformally coated with an electrochemically active material suitable for use as an anode or a cathode in a battery.

Embodiment 11. The process of Embodiment 10 wherein at least 75% of all accessible available surfaces of the monolithic porous open-cell structure are conformally coated with the electrochemically active material.

Embodiment 12. The process of Embodiment 10 wherein at least 90% of all accessible available surfaces of the monolithic porous open-cell structure are conformally coated with the electrochemically active material.

Embodiment 13. The process of any of Embodiments 10 to 12 wherein the electrochemically active material is a lithiated manganese oxide, a lithiated cobalt oxide, a vanadium oxide, a mixed metal oxide, a nickel oxyhydroxide, a manganese dioxide, or a combination thereof.

Embodiment 13A. The process of any of Embodiments 10 to 12 wherein the electrochemically active material is an electrochemically active organic material.

Embodiment 13B. The process of any of Embodiments 10 to 12 wherein the electrochemically active material is an electrochemically active organic material selected from the group consisting of polypyrrole, polyaniline and polyazulene.

Embodiment 14. The process of any of Embodiments 10 to 12 wherein the electrochemically active material is carbon (selected from any of the allotropes thereof), sulfur, tin, nickel, zinc, aluminum, silicon, lithium titanate, lithium, metal hydride, calcium, cadmium, magnesium lithium, or an alloy thereof.

Embodiment 15. The process of any of Embodiments 10 to 14 wherein the microparticles comprised by the microparticulate mass have an average size in the range of about 10 nm to about 100 μm.

Embodiment 16. The process of any of Embodiments 10 to 14 wherein the microparticles comprised by the microparticulate mass have an average size in the range of about 10 nm to 50 μm.

Embodiment 17. The process of any of Embodiments 10 to 14 wherein the microparticles comprised by the microparticulate mass have an average size in the range of about 10 nm to about 25 μm.

Embodiment 18. The process of any of Embodiments 10 to 14 wherein the microparticles comprised by the microparticulate mass have an average size in the range of about 10 nm to about 10 μm.

Embodiment 19. The process of any of Embodiments 10 to 14 wherein the microparticles comprised by the microparticulate mass have an average size in the range of about 100 nm to about 10 μm.

Embodiment 20. The process of any of Embodiments 10 to 14 wherein the microparticles comprised by the microparticulate mass have an average size in the range of about 0.2 μm to about 2 μm.

Embodiment 21. The process of any of Embodiments 10 to 14 wherein the microparticles comprised by the microparticulate mass have an average size in the range of about 0.4 μm to about 2 μm.

Embodiment 22. The process of any of Embodiments 10 to 14 wherein the microparticles comprised by the microparticulate mass have an average size in the range of about 0.5 μm to about 1.5 μm.

Embodiment 23. The process of any of Embodiments 10 to 22 wherein the microparticles comprised by the microparticulate mass have a relative standard deviation of particle size in the range of 5% to 99%.

Embodiment 24. The process of any of Embodiments 10 to 22 wherein the microparticles comprised by the microparticulate mass have a relative standard deviation of particle size in the range of about 25% to about 75%.

Embodiment 25. The process of any of Embodiments 10 to 22 wherein the microparticles comprised by the microparticulate mass have a relative standard deviation of particle size in the range of about 35% to about 75%.

Embodiment 26. The process of any of Embodiments 10 to 22 wherein the microparticles comprised by the microparticulate mass have a relative standard deviation of particle size in the range of about 55% to about 65%.

Embodiment 27. The process of any of Embodiments 10 to 26 wherein the particle size distribution of the microparticles comprised by the microparticulate has a single mode.

Embodiment 28. The process of any of Embodiments 10 to 26 wherein the particle size distribution of the microparticles comprised by the microparticulate has two modes.

Embodiment 29. The process of any of Embodiments 10 to 26 wherein the particle size distribution of the microparticles comprised by the microparticulate has more than two modes.

Embodiment 30. The process of any of Embodiments 10 to 29 wherein the microparticulate mass is a mass of regularly shaped microparticles.

Embodiment 31. The process of Embodiment 30 wherein the regularly shaped microparticles are in the shape of flakes, strands, spheres, ellipsoids, rods, or cubes.

Embodiment 32. The process of any of Embodiments 10 to 29 wherein the microparticulate mass is a mass of irregularly shaped microparticles.

Embodiment 33. The process of any of Embodiments 10 to 29 wherein the microparticulate mass comprises, on a weight basis, at least 10% irregularly shaped particles.

Embodiment 34. The process of any of Embodiments 10 to 29 wherein the microparticulate mass comprises, on a weight basis, at least 20 wt % irregularly shaped particles.

Embodiment 35. The process of any of Embodiments 10 to 29 wherein the microparticulate mass comprises, on a weight basis, at least 30 wt % irregularly shaped particles.

Embodiment 36. The process of any of Embodiments 10 to 29 wherein the microparticulate mass comprises, on a weight basis, at least 40 wt % irregularly shaped particles.

Embodiment 37. The process of any of Embodiments 10 to 29 wherein the microparticulate mass comprises, on a weight basis, at least 50 wt % irregularly shaped particles.

Embodiment 38. The process of any of Embodiments 10 to 29 wherein the microparticulate mass comprises, on a weight basis, at least 60 wt % irregularly shaped particles.

Embodiment 39. The process of any of Embodiments 10 to 29 wherein the microparticulate mass comprises, on a weight basis, at least 70 wt % irregularly shaped particles.

Embodiment 40. The process of any of Embodiments 10 to 29 wherein the microparticulate mass comprises, on a weight basis, at least 80 wt % irregularly shaped particles.

Embodiment 41. The process of any of Embodiments 10 to 29 wherein the microparticulate mass comprises, on a weight basis, at least 90 wt % irregularly shaped particles.

Embodiment 42. The process of any of Embodiments 10 to 29 wherein the microparticulate mass comprises, on a weight basis, at least 95 wt % irregularly shaped particles.

Embodiment 43. The process of any of Embodiments 10 to 42 wherein the microparticles within the microparticulate mass have an average aspect ratio of about 1:1 to about 10:1.

Embodiment 44. The process of any of Embodiments 10 to 42 wherein the microparticles within the microparticulate mass have an average aspect ratio of about 1:1 to about 5:1.

Embodiment 45. The process of any of Embodiments 10 to 42 wherein the microparticles within the microparticulate mass have an average aspect ratio of about 1:1 to about 4:1.

Embodiment 46. The process of any of Embodiments 10 to 42 wherein the microparticles within the microparticulate mass have an average aspect ratio of about 1:1 to about 3:1.

Embodiment 47. The process of any of Embodiments 10 to 42 wherein the microparticles within the microparticulate mass have an average aspect ratio of about 1:1 to about 2:1.

Embodiment 48. The process of any of Embodiments 10 to 42 wherein the microparticles within the microparticulate mass have an average aspect ratio of about 1:1 to about 1.5:1

Embodiment 49. The process of any of Embodiments 43 to 48 wherein the microparticles within the microparticulate mass have a relative standard deviation of aspect ratio of less than 5%.

Embodiment 50. The process of any of Embodiments 43 to 48 wherein the microparticles within the microparticulate mass have a relative standard deviation of aspect ratio of about 5% to about 99%.

Embodiment 51. The process of any of Embodiments 43 to 48 wherein the microparticles within the microparticulate mass have a relative standard deviation of aspect ratio in the range of about 25% to about 75%, Embodiment 52. The process of any of Embodiments 43 to 48 wherein the microparticles within the microparticulate mass have a relative standard deviation of aspect ratio of about 35% to about 75%.

Embodiment 53. The process of any of Embodiments 43 to 48 wherein the microparticles within the microparticulate mass have a relative standard deviation of aspect ratio of about 55% to about 65%.

Embodiment 54. The process of any of the preceding enumerated Embodiments wherein the mass comprises microparticles containing aluminum, carbon, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, silicon, indium, an alloy of any of the aforementioned elements, an oxide thereof, a nitride thereof, a carbide thereof, a silicide thereof, a boride thereof, or a combination of any of the foregoing elements, oxides, nitrides, carbide, silicide, boride.

Embodiment 55. The process of any of the preceding enumerated Embodiments wherein the mass comprises microparticles selected from the group consisting of polystyrene, polymethylmethacrylate, polylactic acid, polyethylene, polyacrylic acid, polyglycolic acid, and the copolymers and polymer blends thereof.

Embodiment 56. The process of any of the preceding enumerated Embodiments wherein the template is infiltrated at least twice with a framework material.

Embodiment 57. The process of any of Embodiments 1-56 wherein the template is infiltrated at least twice with a framework material, and the framework materials infiltrated in the separate steps are different.

Embodiment 58. The process of any of Embodiments 1-56 wherein the template is infiltrated at least twice with a framework material, and the framework materials infiltrated in the separate steps are different.

Embodiment 59. The process of any preceding enumerated Embodiment wherein the framework material and the microparticles comprise chemically distinct materials.

Embodiment 60. A monolithic porous open-cell structure comprising a three-dimensional network of interconnected unit cells, the unit cells being bounded by a framework material and having interconnectivity windows for fluid flow between the unit cells, the monolithic porous open-cell structure having a void volume fraction of at least 25%, the cells have an average size in the range of about 10 nm to about 100 µm.

Embodiment 61. The monolithic porous open-cell structure of Embodiment 60 wherein the monolithic porous open-cell structure has an average size relative standard deviation of greater than 5%.

Embodiment 62. The monolithic porous open-cell structure of Embodiment 60 wherein the monolithic porous open-cell structure has an average size relative standard deviation of less than 5%.

Embodiment 63. A monolithic porous open-cell structure comprising a three-dimensional network of interconnected unit cells, the unit cells being bounded by a framework material having interconnectivity windows for fluid flow between the unit cells, the monolithic porous open-cell structure having a void volume fraction of at least 25%, the unit cells have an average size in the range of about 10 nm to about 100 µm, and an average aspect ratio in the range of about 1:1 to about 10:1.

Embodiment 64. The monolithic porous open-cell structure of Embodiment 63 wherein the unit cells have an aspect ratio relative standard deviation of at least 5%.

Embodiment 65. The monolithic porous open-cell structure of Embodiment 63 wherein the unit cells have an aspect ratio relative standard deviation of less than 5%.

Embodiment 66. A monolithic porous open-cell structure comprising a three-dimensional network of interconnected unit cells, the unit cells being bounded by a framework material having interconnectivity windows for fluid flow between the unit cells, the monolithic porous open-cell structure having a void volume fraction of at least 25%, the unit cells have an average size in the range of about 10 nm to about 100 µm, and the interconnectivity windows have an average size in the range of about 20 to 99% of the average unit cell size.

Embodiment 67. The monolithic porous open-cell structure of Embodiment 66 wherein the interconnectivity windows have an average size relative standard deviation greater than 5%.

Embodiment 68. The monolithic porous open-cell structure of Embodiment 66 wherein the interconnectivity windows have an average size relative standard deviation less than 5%.

Embodiment 69. A monolithic porous open-cell structure comprising a three-dimensional network of interconnected unit cells, the unit cells being bounded by framework material having interconnectivity windows for fluid flow between the unit cells, the monolithic porous open-cell structure having a void volume fraction of at least 25%, the unit cells having an average size in the range of about 10 nm to about 100 µm, the interconnectivity windows having an average size in the range of about 20 to 99% of the average unit cell size, and an average aspect ratio in the range of about 1:1 to about 10:1.

Embodiment 70. The monolithic porous open-cell structure of Embodiment 69 wherein the interconnectivity windows have an aspect ratio relative standard deviation greater than 5%.

Embodiment 71. The monolithic porous open-cell structure of Embodiment 69 wherein the interconnectivity windows have an aspect ratio relative standard deviation less than 5%.

Embodiment 72. A monolithic porous open-cell structure comprising a three-dimensional network of interconnected unit cells, the unit cells being bounded by an electrically conductive framework having interconnectivity windows for fluid flow between the unit cells, the monolithic porous open-cell structure having a void volume fraction of at least 25%, the unit cells have an average size in the range of about 10 nm to about 100 µm, the interconnectivity windows having an average size in the range of about 20 to 99% of the average unit cell size, the porous open-cell structure having a first surface, an opposing second surface, a thickness T as measured from the first to the second surface, a first surface region extending from the first surface and toward the second surface and having a thickness $T_1$, a second surface region extending from the second surface and toward the first surface and having a thickness $T_2$, and an average unit cell size gradient from the first to the second surface, wherein a ratio of the average unit cell size in the second surface region to the average unit cell size in the first surface region is in the range of 1:1 to 10:1.

Embodiment 73. The process of any of Embodiments 1-59 or the monolithic porous open-cell structure of any of Embodiments 60-72 wherein the framework material is electrically conductive.

Embodiment 74. The process of any of Embodiments 1-59 or the monolithic porous open-cell structure of any of Embodiments 60-73 wherein the framework material is a metal, a metal alloy, a ceramic, an oxide, a nitride, a silicide, a boride, a carbide, carbon (including all of the allotropes thereof), a Group IV semiconductor material, a compound semiconductor material, or a polymer.

Embodiment 75. The process of any of Embodiments 1-59 or the monolithic porous open-cell structure of any of Embodiments 60-73 wherein the framework material comprises aluminum, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, silicon, indium, an alloy of any of the aforementioned elements, an oxide thereof, a nitride thereof, a carbide thereof, a silicide thereof, a boride thereof, or a combination of any of the foregoing elements, oxides, nitrides, carbide, silicide, boride.

Embodiment 76. The process or monolithic porous open-cell structure of any preceding enumerated Embodiment wherein the framework material comprises a polymeric material.

Embodiment 77. The process or monolithic porous open-cell structure of any preceding enumerated Embodiment wherein the monolithic porous open-cell structure has a flat prismatic shape.

Embodiment 78. The process or monolithic porous open-cell structure of any preceding enumerated Embodiment wherein the monolithic porous open-cell structure has a 3-dimensional (non-prismatic) shape.

Embodiment 79. The process or monolithic porous open-cell structure of any preceding enumerated Embodiment wherein the monolithic porous open-cell structure has a thickness of at least 1 µm.

Embodiment 80. The process or monolithic porous open-cell structure of any preceding enumerated Embodiment wherein the monolithic porous open-cell structure has a thickness of at least 10 µm.

Embodiment 81. The process or monolithic porous open-cell structure of any preceding enumerated Embodiment wherein the monolithic porous open-cell structure has a thickness of at least 50 µm.

Embodiment 82. The process or monolithic porous open-cell structure of any preceding enumerated Embodiment wherein the monolithic porous open-cell structure has a thickness of at least 100 µm.

Embodiment 83. The process or monolithic porous open-cell structure of any preceding enumerated Embodiment wherein the monolithic porous open-cell structure has a thickness of at least 200 µm.

Embodiment 84. The process or monolithic porous open-cell structure of any preceding enumerated Embodiment wherein the monolithic porous open-cell structure has a thickness of at least 500 µm.

Embodiment 85. The process or monolithic porous open-cell structure of any preceding enumerated Embodiment wherein the monolithic porous open-cell structure has a thickness of at least 750 µm.

Embodiment 86. The process or monolithic porous open-cell structure of any preceding enumerated Embodiment wherein the monolithic porous open-cell structure has a thickness of at least 1 mm.

Embodiment 87. The process or monolithic porous open-cell structure of any preceding enumerated Embodiment wherein the monolithic porous open-cell structure has a thickness of at least 2 mm.

Embodiment 88. The process or monolithic porous open-cell structure of any preceding enumerated Embodiment wherein the monolithic porous open-cell structure has a thickness of at least 3 mm.

Embodiment 89. The process or monolithic porous open-cell structure of any preceding enumerated Embodiment wherein the monolithic porous open-cell structure has a thickness of at least 4 mm.

Embodiment 90. The process or monolithic porous open-cell structure of any preceding enumerated Embodiment wherein the monolithic porous open-cell structure has a thickness of at least 5 mm.

Embodiment 91. The process or monolithic porous open-cell structure of any preceding enumerated Embodiment wherein the monolithic porous open-cell structure comprises unit cells having an average size in the range of about 10 nm to about 100 µm.

Embodiment 92. The process or monolithic porous open-cell structure of any preceding enumerated Embodiment wherein the monolithic porous open-cell structure comprises unit cells having an average size in the range of about 10 nm to 50 µm.

Embodiment 93. The process or monolithic porous open-cell structure of any preceding enumerated Embodiment wherein the monolithic porous open-cell structure comprises unit cells having an average size in the range of about 10 nm to about 25 µm.

Embodiment 94. The process or monolithic porous open-cell structure of any preceding enumerated Embodiment wherein the monolithic porous open-cell structure comprises unit cells having an average size in the range of about 10 nm to about 10 µm.

Embodiment 95. The process or monolithic porous open-cell structure of any preceding enumerated Embodiment wherein the monolithic porous open-cell structure comprises unit cells having an average size in the range of about 100 nm to about 10 µm.

Embodiment 96. The process or monolithic porous open-cell structure of any preceding enumerated Embodiment wherein the monolithic porous open-cell structure comprises unit cells having an average size in the range of about 100 nm to about 5 µm.

Embodiment 97. The process or monolithic porous open-cell structure of any preceding enumerated Embodiment wherein the monolithic porous open-cell structure comprises unit cells having an average size in the range of about 0.2 µm to about 2 µm.

Embodiment 98. The process or monolithic porous open-cell structure of any preceding enumerated Embodiment wherein the monolithic porous open-cell structure comprises unit cells having an average size in the range of about 0.4 µm to about 2 µm.

Embodiment 99. The process or monolithic porous open-cell structure of any preceding enumerated Embodiment wherein the monolithic porous open-cell structure comprises unit cells having an average size in the range of about 0.5 µm to about 1.5 µm.

Embodiment 100. The process or monolithic porous open-cell structure of any preceding enumerated Embodiment wherein the monolithic porous open-cell structure comprises unit cells having a relative standard deviation of the average unit cell size of at least 5%.

Embodiment 101. The process or monolithic porous open-cell structure of any preceding enumerated Embodiment wherein the monolithic porous open-cell structure comprises unit cells having a relative standard deviation of the average unit cell size of about 25% to about 75%.

Embodiment 102. The process or monolithic porous open-cell structure of any preceding enumerated Embodiment wherein the monolithic porous open-cell structure comprises unit cells having a relative standard deviation of the average unit cell size of about 35% to about 75%.

Embodiment 103. The process or monolithic porous open-cell structure of any preceding enumerated Embodiment wherein the monolithic porous open-cell structure comprises unit cells having a relative standard deviation of the average unit cell size of about 55% to about 65%.

Embodiment 104. The process or monolithic porous open-cell structure of any preceding enumerated Embodiment wherein the unit cells have an average aspect ratio of about 1:1 to about 10:1.

Embodiment 105. The process or monolithic porous open-cell structure of any preceding enumerated Embodiment wherein the unit cells have an average aspect ratio of about 1:1 to about 5:1.

Embodiment 106. The process or monolithic porous open-cell structure of any preceding enumerated Embodiment wherein the unit cells have an average aspect ratio of about 1:1 to about 4:1.

Embodiment 107. The process or monolithic porous open-cell structure of any preceding enumerated Embodiment wherein the unit cells have an average aspect ratio of about 1:1 to about 3:1.

Embodiment 108. The process or monolithic porous open-cell structure of any preceding enumerated Embodiment wherein the unit cells have an average aspect ratio of about 1:1 to about 2:1.

Embodiment 109. The process or monolithic porous open-cell structure of any preceding enumerated Embodiment wherein the unit cells have an average aspect ratio of about 1:1 to about 1.5:1.

Embodiment 110. The process or monolithic porous open-cell structure of any preceding enumerated Embodiment wherein the unit cells have a relative standard deviation of aspect ratio of less than 5%.

Embodiment 111. The process of any of Embodiments 1-59 or the monolithic porous open-cell structure of any of Embodiments 60-109 wherein the unit cells have a relative standard deviation of aspect ratio of about 5% to about 99%.

Embodiment 112. The process of any of Embodiments 1-59 or the monolithic porous open-cell structure of any of Embodiments 60-109 wherein the unit cells have a relative standard deviation of aspect ratio of about 25% to about 75%.

Embodiment 113. The process of any of Embodiments 1-59 or the monolithic porous open-cell structure of any of Embodiments 60-109 wherein the unit cells have a relative standard deviation of aspect ratio of about 35% to about 75%.

Embodiment 114. The process of any of Embodiments 1-59 or the monolithic porous open-cell structure of any of Embodiments 60-109 wherein the unit cells have a relative standard deviation of aspect ratio of about 55% to about 65%.

Embodiment 115. The process or monolithic porous open-cell structure of any preceding enumerated Embodiment wherein the monolithic porous open-cell structure comprises interconnectivity windows between the unit cells have an average size up to 99% of the average unit cell size.

Embodiment 116. The process or monolithic porous open-cell structure of any preceding enumerated Embodiment wherein the monolithic porous open-cell structure comprises interconnectivity windows between the unit cells have an average size that is in the range of 20% to 99% of the average the unit cell size.

Embodiment 117. The process or monolithic porous open-cell structure of any preceding enumerated Embodiment wherein the monolithic porous open-cell structure comprises interconnectivity windows between the unit cells have an average size that is in the range of 30% to 80% of the average unit cell size.

Embodiment 118. The process or monolithic porous open-cell structure of any preceding enumerated Embodiment wherein the monolithic porous open-cell structure comprises interconnectivity windows between the unit cells have an average size that is in the range of 40% to 70% of the average unit cell size.

Embodiment 119. The process or monolithic porous open-cell structure of any preceding enumerated Embodiment wherein the monolithic porous open-cell structure comprises interconnectivity windows between the unit cells have an average size that is in the range of 50% to 60% of the average unit cell size.

Embodiment 120. The process or monolithic porous open-cell structure of any preceding enumerated Embodiment wherein the relative standard deviation of the average size of the interconnectivity windows within the porous structure is less than 5%.

Embodiment 121. The process of any of Embodiments 1-59 or the monolithic porous open-cell structure of any of Embodiments 60-119 wherein the relative standard deviation of the average size of the interconnectivity windows within the porous structure is in the range of about 5% to 99%.

Embodiment 122. The process of any of Embodiments 1-59 or the monolithic porous open-cell structure of any of Embodiments 60-119 wherein the relative standard deviation of the average size of the interconnectivity windows within the porous structure is in the range of about 25% to 75%.

Embodiment 123. The process of any of Embodiments 1-59 or the monolithic porous open-cell structure of any of Embodiments 60-119 wherein the relative standard deviation of the average size of the interconnectivity windows within the porous structure is in the range of about 35% to about 75%.

Embodiment 124. The process of any of Embodiments 1-59 or the monolithic porous open-cell structure of any of Embodiments 60-119 wherein the relative standard deviation of the average size of the interconnectivity windows within the porous structure is in the range of about 55% to about 65%.

Embodiment 125. The process or monolithic porous open-cell structure of any preceding enumerated Embodiment wherein the interconnectivity windows within a porous structure have an average aspect ratio of at least about 1:1.

Embodiment 126. The process or monolithic porous open-cell structure of any preceding enumerated Embodiment wherein the interconnectivity windows within a porous structure have an average aspect ratio of at least about 1.25:1.

Embodiment 127. The process or monolithic porous open-cell structure of any preceding enumerated Embodiment wherein the interconnectivity windows within a porous structure have an average aspect ratio of at least about 1.5:1.

Embodiment 128. The process or monolithic porous open-cell structure of any preceding enumerated Embodiment wherein the interconnectivity windows within a porous structure have an average aspect ratio of at least about 2:1.

Embodiment 129. The process or monolithic porous open-cell structure of any preceding enumerated Embodiment wherein the interconnectivity windows within a porous structure have an average aspect ratio of at least about 3:1.

Embodiment 130. The process or monolithic porous open-cell structure of any preceding enumerated Embodiment wherein the interconnectivity windows within a porous structure have an average aspect ratio of at least about 4:1.

Embodiment 131. The process or monolithic porous open-cell structure of any preceding enumerated Embodiment wherein the interconnectivity windows within a porous structure have an average aspect ratio of at least about 5:1.

Embodiment 132. The process or monolithic porous open-cell structure of any preceding enumerated Embodiment wherein the interconnectivity windows within a porous structure have an average aspect ratio of less than about 10:1.

Embodiment 133. The process or monolithic porous open-cell structure of any preceding enumerated Embodiment wherein the shape of the template is formed using a 3D mold.

Embodiment 134. The process or monolithic porous open-cell structure of any preceding enumerated Embodiment wherein the unit cells comprise a population of unit cells having a monodisperse size distribution.

Embodiment 135. The process or monolithic porous open-cell structure of any preceding enumerated Embodiment wherein the unit cells comprise a population of unit cells having a bi-modal, tri-modal, or multimodal size distribution.

Embodiment 136. The process or monolithic porous open-cell structure of any preceding enumerated Embodiment wherein the monolithic porous open-cell structure has a void volume fraction of at least about 35%.

Embodiment 137. The process or monolithic porous open-cell structure of any preceding enumerated Embodiment wherein the monolithic porous open-cell structure has a void volume fraction of at least about 50%.

Embodiment 138. The process or monolithic porous open-cell structure of any preceding enumerated Embodiment wherein the monolithic porous open-cell structure has a void volume fraction of at least about 60%.

Embodiment 139. The process or monolithic porous open-cell structure of any preceding enumerated Embodiment wherein the monolithic porous open-cell structure has a void volume fraction of at least about 75%.

Embodiment 140. The process or monolithic porous open-cell structure of any preceding enumerated Embodiment wherein the monolithic porous open-cell structure has a void volume fraction of at least about 90%.

Embodiment 141. The process or monolithic porous open-cell structure of any preceding enumerated Embodiment wherein the monolithic porous open-cell structure has a void volume fraction of at least about 95%.

Embodiment 142. The process or monolithic porous open-cell structure of any preceding enumerated Embodiment wherein the monolithic porous open-cell structure has a void volume fraction of at least about 99%.

Embodiment 143. A primary or secondary battery comprising a monolithic porous open-cell structure of any preceding enumerated Embodiment

EXAMPLES

1. Conformal Electrodeposition on Porous Copper Templates

Figure 7:
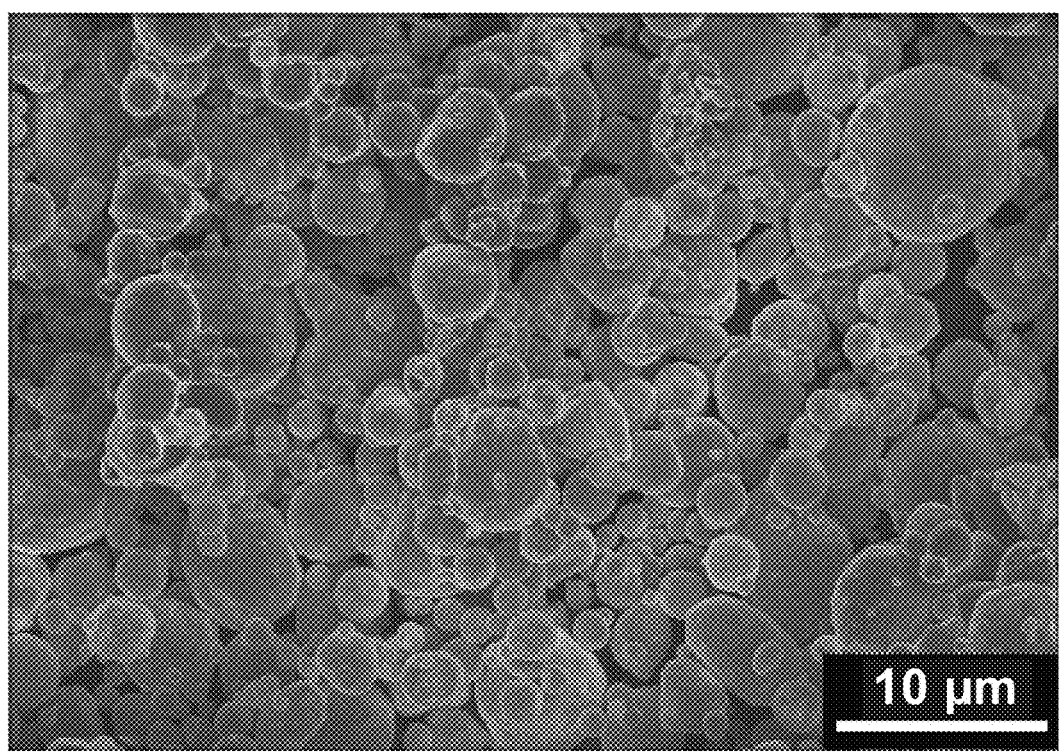
FIG. 7 is a SEM micrograph of copper particles, as described in Example 1.
Figure 8:
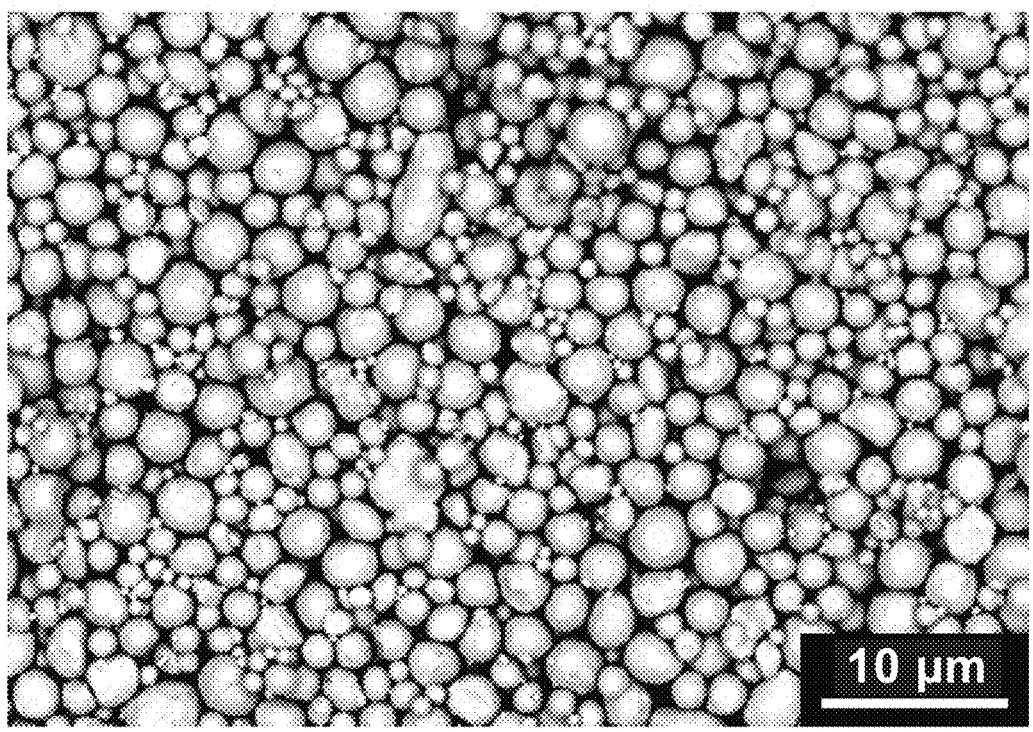
FIG. 8 is a SEM micrograph of copper particles, after sedimentation process, used to make porous templates as described in Example 1.

Copper powders from Atlantic Equipment Engineers (product number Cu-110) were used to fabricate porous metal templates. The powders consisted of particles that were mostly spherical in shape and had diameters in the range of about 500 nm to 10 um (FIG. 7). In this case, the largest particles were mostly removed using sedimentation. FIG. 8 is a scanning electron microscopy (SEM) micrograph of the copper particles after the sedimentation procedure. Other methods can also be used to narrow the particle size distribution including ball milling, centrifugation, ultra sonic separation, and filtration.

Figure 9:
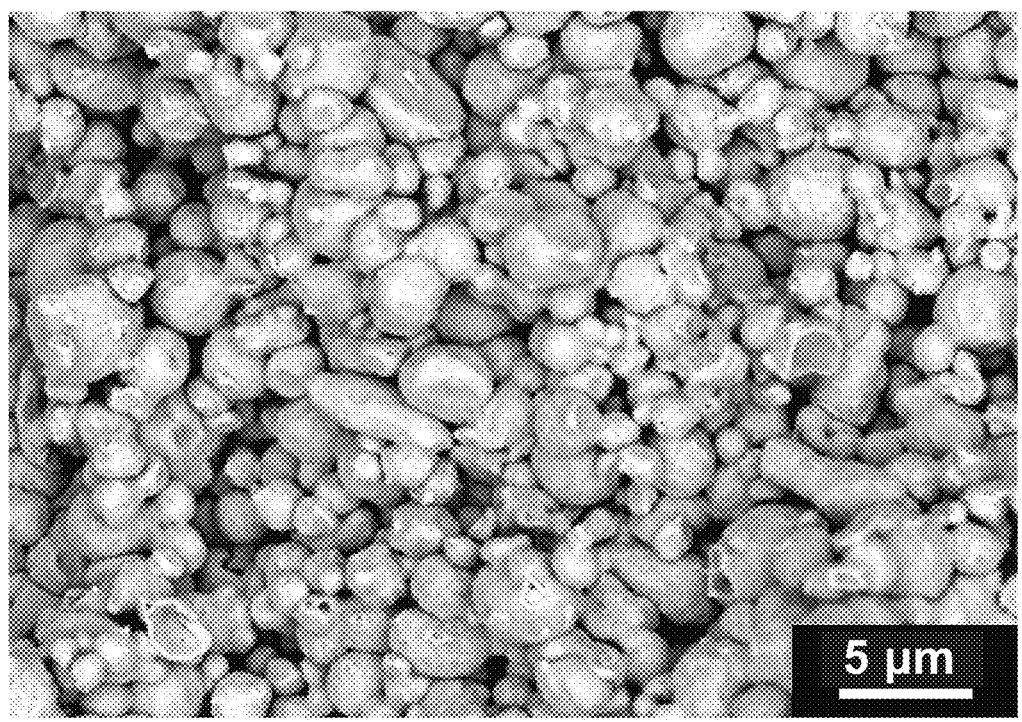
FIG. 9 is a fracture cross-section SEM micrograph of a porous template comprising the copper particles of FIG. 8, after pressing at 283 MPa as described in Example 1.

To form a rigid template, the powders were first dispersed in a solvent (ethanol or IPA). High concentrations of the copper powder were used resulting in a viscous solution. This viscous solution was then drop cast, spun cast, or tape cast on a stainless steel substrate. A smooth film of copper powder results after drying. Next, the native oxide present on the copper particles was removed by heating to 400° C. in a reducing atmosphere (5% hydrogen in argon). During heating, the loose copper powder sinters to form a rigid, but still fragile copper film that delaminates from the stainless steel substrate. Pressing at 283 MPa was used to further compact the porous copper template. FIG. 9 is a fracture cross-section SEM micrograph of the copper particles after pressing.

The native oxide removal was used because the native oxide electrically isolates the individual metal particles. Thus, even though the metal particles are conductive, the porous template as a whole would not be electrically conductive because of the native oxide interfaces between individual particles. The oxide layer on the surface of the metal also inhibits electron transfer, and thus metal electrodeposition. Because the oxide can re-form in air, the porous copper templates were either stored in an inert atmosphere or immediately pressed and plated following oxide reduction. To encourage uniform and conformal deposition of nickel, the plating solution can be heated and stirred and potential pulses can be used instead of constantly applying a voltage. Typically, −2V vs. a nickel counter electrode was applied for 35 seconds followed by a 2 minute rest period. The plating solution was purchased from Technic, Inc. and the primary nickel ion source was nickel sulfamate.

Following nickel deposition, the copper template was removed using an aqueous solution of ammonium persulfate (10% by mass). This solution selectively etched the copper but not the nickel. The SEM micrograph in FIG. 10 is a fracture cross-section of a nickel inverse structure fabricated using the copper templates.

Figure 10:
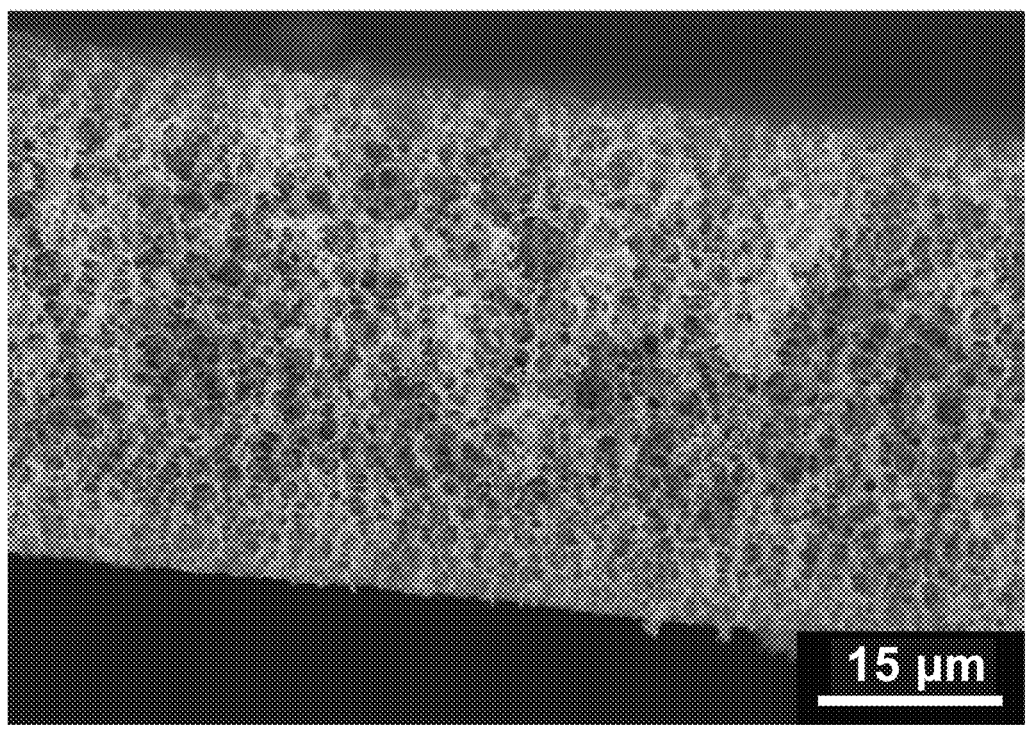
FIG. 10 is a fracture cross-section SEM micrograph of a highly porous nickel inverse structure fabricated using the copper template of FIG. 9 as described in Example 1.
Figure 11A:
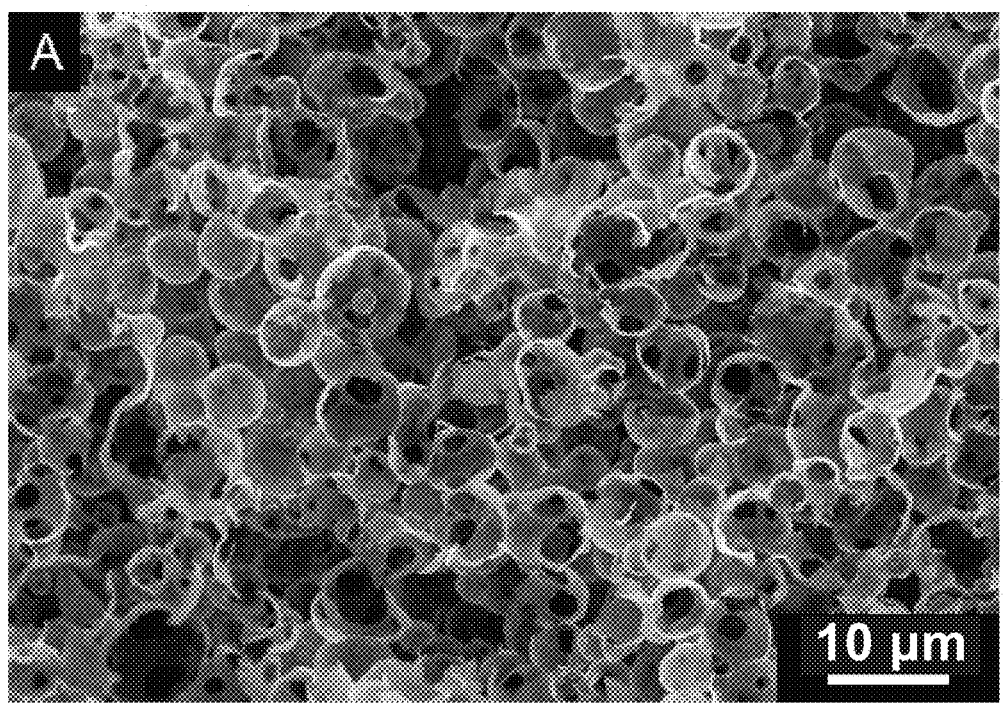
FIG. 11A is a fracture cross-section SEM micrograph of a highly porous nickel inverse structure fabricated using a porous copper template that was pressed at 40 MPa as described in Example 1.
Figure 11B:
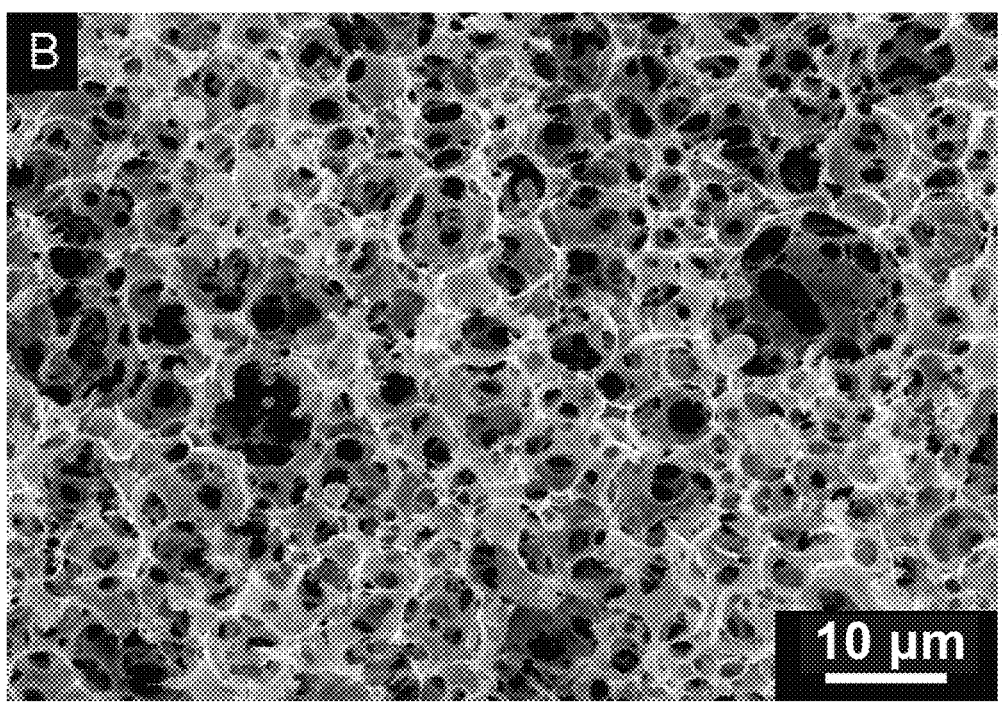
FIG. 11B is a fracture cross-section SEM micrograph of a highly porous nickel inverse structure fabricated using a porous copper template that was pressed at 283 MPa as described in Example 1.

FIG. 10 compares two-nickel inverse structures fabricated using two different copper templates. The two templates were pressed at different pressures. The copper template used to make the nickel inverse structures of FIGS. 11A and 11B were pressed at 40 and 283 MPa, respectively. The difference between these two-nickel inverse structures illustrates the versatility of the process of this disclosure. By simply changing the pressing pressure, two drastically different structures were achieved. Increased pressures yield a more open and porous final inverse structure. No additional processes or equipment were required to make different final inverse structures using the same starting materials (in this case, copper powder).

2. Bottom-Up Infilling in Aluminum Porous Templates

Figure 12:
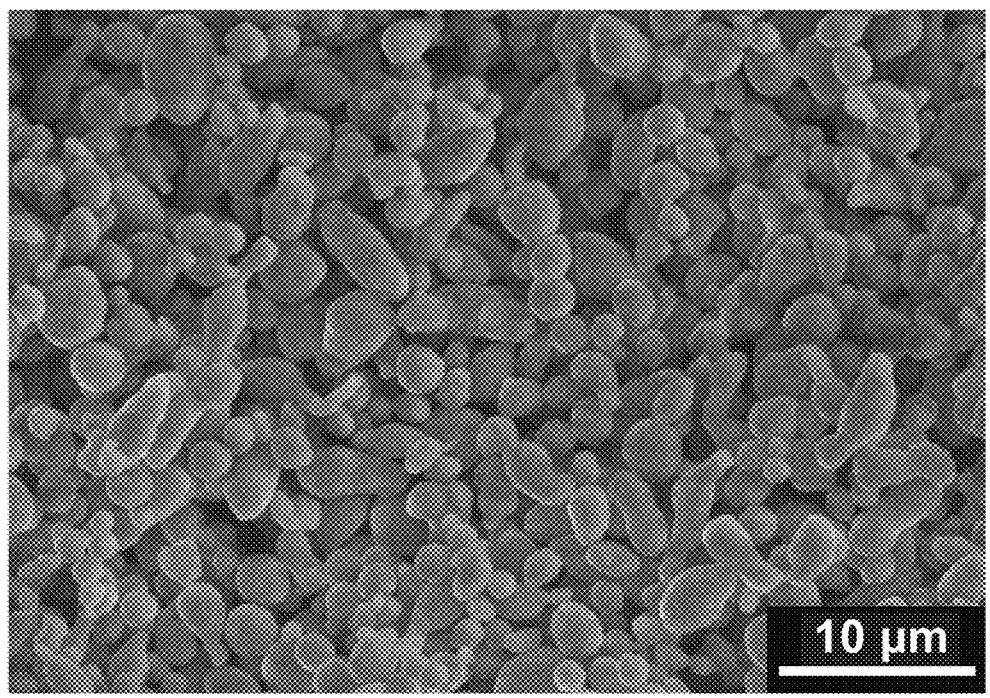
FIG. 12 is a SEM micrograph of aluminum particles, as received as described in Example 2.

Aluminum powders from Atlantic Equipment Engineers (product number Al-100) were used to fabricate rigid porous templates. The powders consisted of particles that were mostly spherical in shape and have diameters in the range of about 500 nm to 3 um (FIG. 12).

Figure 13:
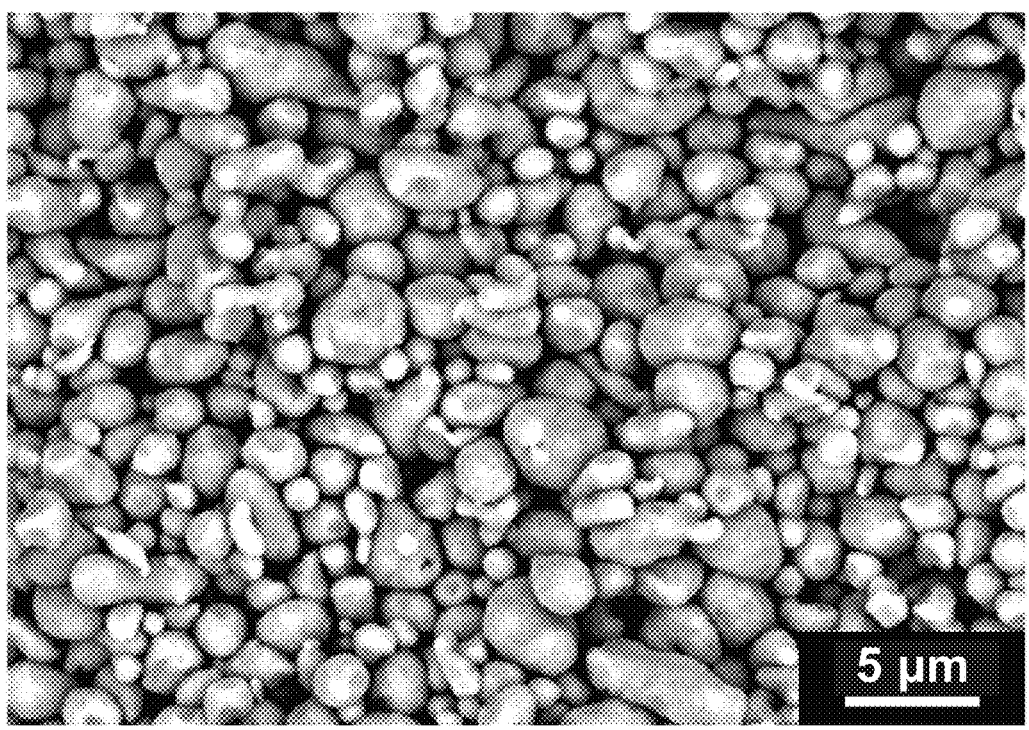
FIG. 13 is a fracture cross-section SEM micrograph of a porous template comprising the aluminum particles of FIG. 12, after pressing at 11 MPa as described in Example 2.

To form a rigid template, the powders were first dispersed in a solvent (ethanol or IPA). High concentrations of the aluminum powder were used resulting in a viscous solution. This viscous solution was then drop cast, spun cast, or tape cast on a stainless steel substrate. A smooth film of aluminum powder results after drying. The aluminum films were then pressed in between stainless steel to form rigid porous aluminum templates (FIG. 13). Following pressing, the aluminum template separates from the stainless steel and was thus, free standing. Typically, the aluminum was pressed at 11 MPa.

Aluminum has a dense and stable native oxide that is difficult to remove. Thus, conformal metal deposition on the template by electrodeposition can be challenging. Inversion using aluminum templates was achieved by implementing a bottom-up infilling electrodeposition. After pressing, an electrically conductive layer was applied to one side of the pressed aluminum rigid body by a physical vapor deposition technique. This technique is a "line-of-sight" technique and deposits the conductive material only on the very bottom of the porous aluminum template. This conductive layer was used to achieve bottom-up infilling of nickel by electrodeposition inside the porous aluminum template. Electrodeposition was done using a nickel plating solution from Technic, Inc. Typically, −1.6V was applied vs. a nickel counter electrode to achieve uniform infilling of nickel in the aluminum templates.

Figure 14:
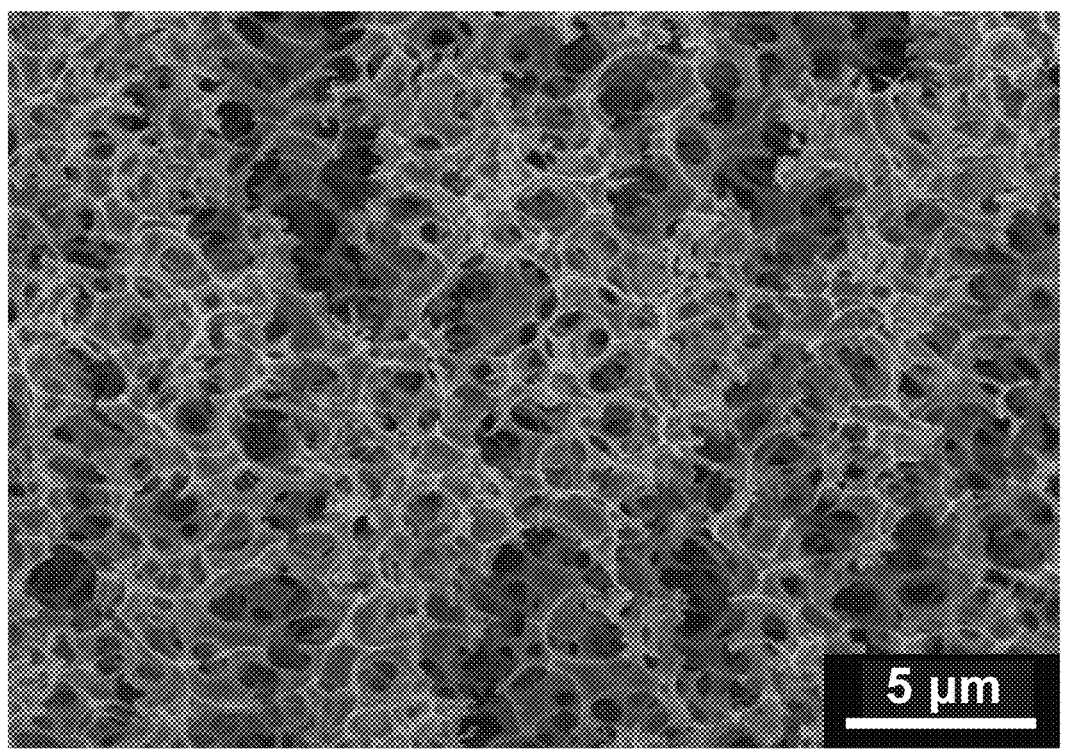
FIG. 14 is a fracture cross-section SEM micrograph of a highly porous nickel inverse structure fabricated using the aluminum template of FIG. 13 as described in Example 2.

The aluminum template was removed by chemical etching. Hydrofluoric acid or potassium hydroxide preferentially etches aluminum in the presence of nickel. For this example, the conductive substrate layer was chosen so that it could be selectively etched over nickel. Copper was used as the conductive layer and a second solution of ammonium persulfate etches the copper after template inversion. The SEM micrograph in FIG. 14 is a fracture cross-section of a nickel inverse structure fabricated from the aluminum templates.

3. Lithium-Ion Battery Cathode—Manganese Oxide on Nickel

The highly porous nickel inverse structure whose fabrication scheme was described in Examples 1 and 2, are useful as highly porous electrodes for batteries. The inverse structures can be applied to a wide range of battery chemistries. In this example, we use the highly porous nickel inverse structures to make a cathode for a lithium-ion battery.

Figure 15A:
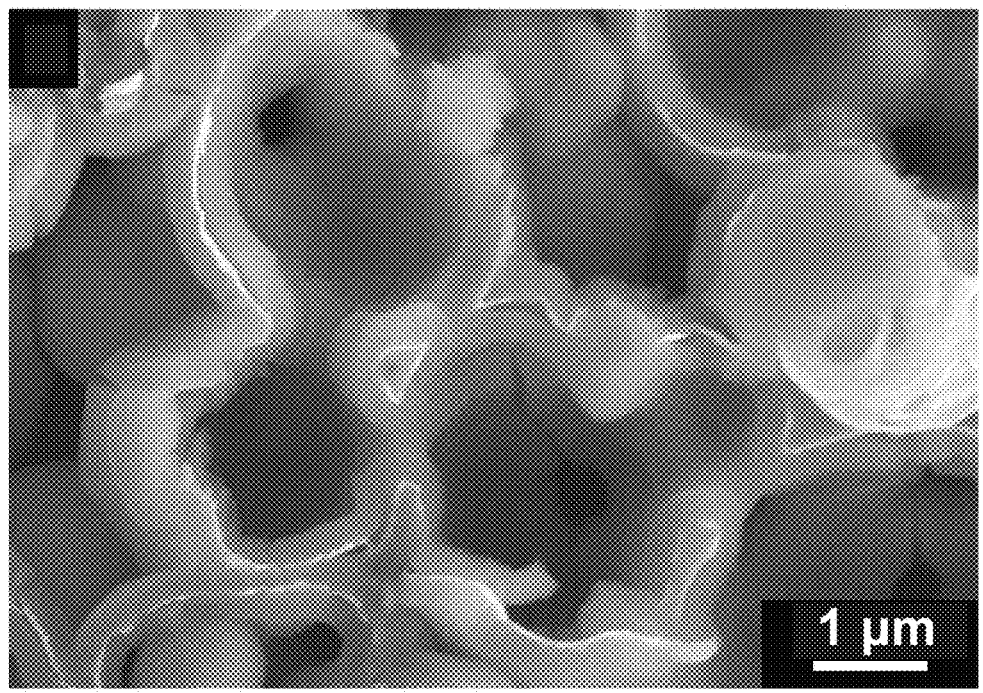
FIG. 15A is a fracture cross-section SEM micrograph of a highly porous nickel inverse structure coated with manganese oxide. The nickel inverse structure was fabricated as described in Example 3 using a porous copper template, similar to the template in FIG. 9.
Figure 15B:
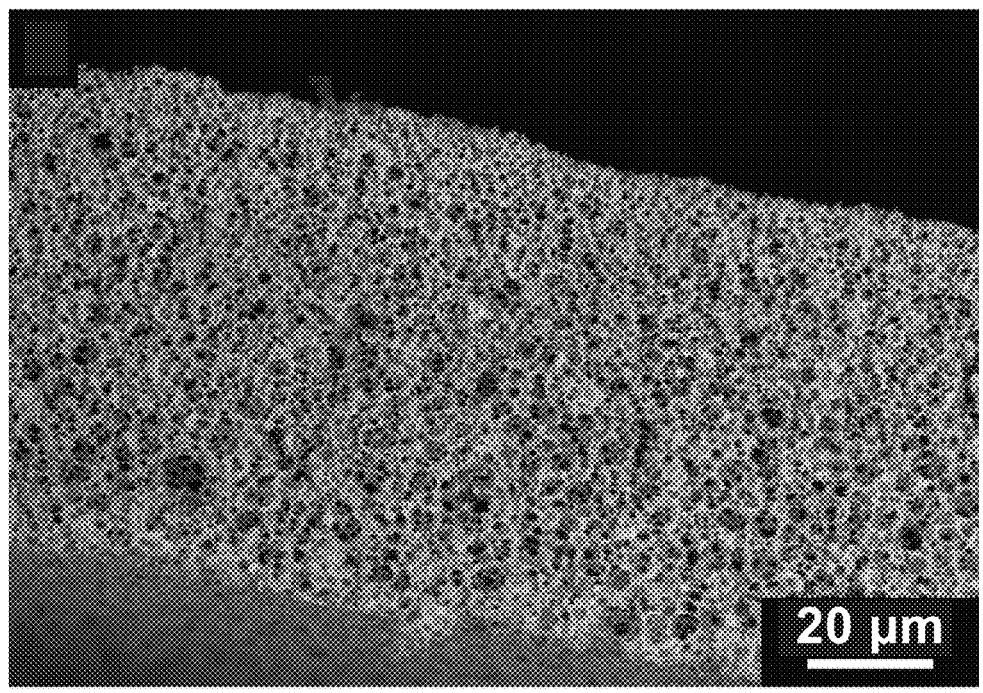
FIG. 15B is a fracture cross-section SEM micrograph of a highly porous nickel inverse structure coated with manganese oxide. The nickel inverse structure was fabricated as described in Example 3 using a porous copper template, similar to the template in FIG. 9.

To make a functional electrode, an active material was conformally deposited on the nickel inverse structure. Conformality is a requirement to maximize energy density and to preserve the pore network of the electrode. Using a potassium permanganate aqueous solution, manganese oxide was conformally deposited on the nickel structures by applying cathodic pulses (−1.5 V vs. Ag/AgCl reference electrode). The voltage pulses were typically applied for 20 seconds with 1 minute rest periods between pulses. FIGS. 15A and 15B display SEM micrographs of the manganese oxide coating on nickel inverse structures. The brighter white layer in FIG. 15A is the nickel inverse structure and the thicker layer surrounding the nickel is the manganese oxide. The coating was conformal, that is, all surfaces were coated with manganese oxide. FIG. 15B highlights the uniformity of the coating throughout the bulk of the sample. The manganese oxide thickness does not significantly vary throughout the depth of the sample. Note that FIGS. 15A and 15B were collected from different samples, processed using the same conditions.

Figure 15C:
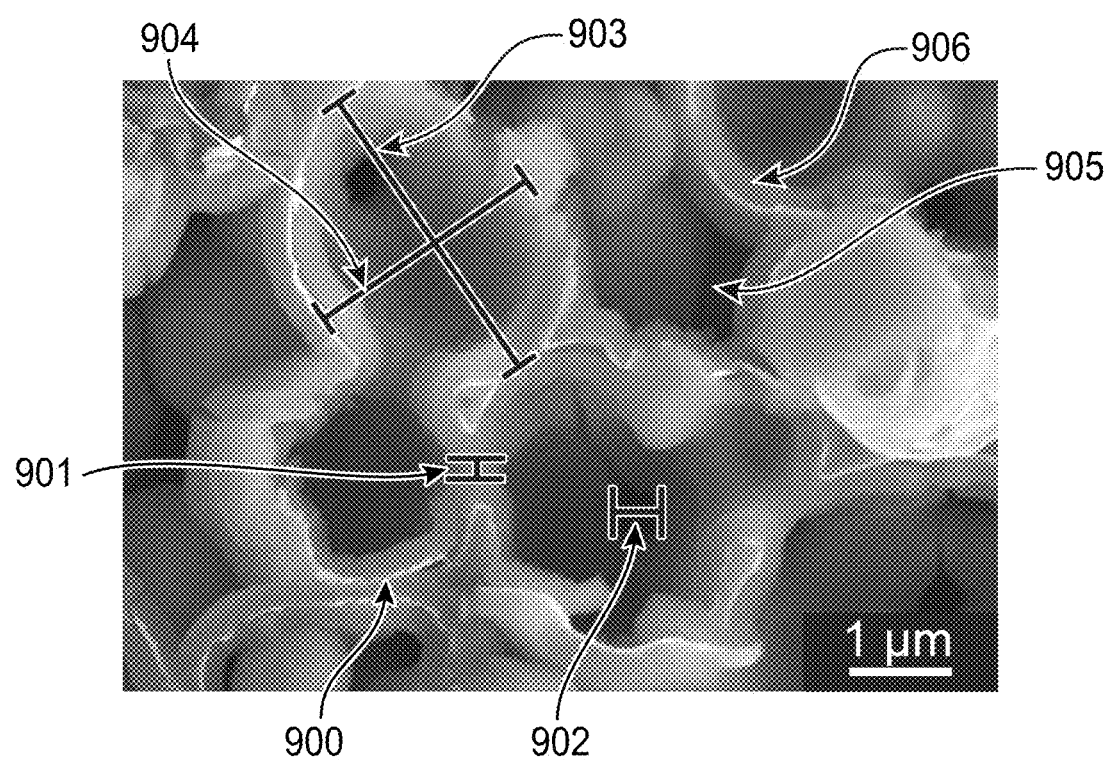
FIG. 15C is an annotated, enlarged image of a portion of the fracture cross-section SEM of FIG. 15A.

FIG. 15C is an annotated version of FIG. 15A, annotated to show the nickel scaffold 900, lithium manganese oxide layer 906, interstitial volume 905, interconnectivity windows 901, 902 and dimension 903, 904. As illustrated, one of the unit cells has a size corresponding to dimension 903 (the largest dimension for that cell as depicted in this representative cross-section of the porous structure) and an aspect ratio corresponding to the ratio of dimension 903 to dimension 904 (the dimension that is orthogonal to dimension 903 in this cross-section of the porous structure).

Following electrodeposition, the manganese oxide coated nickel was immersed in a molten salt containing lithium hydroxide and lithium nitrate at 300° C. to enhance the electrochemical properties of the manganese oxide. After removal from the molten salt, the electrode was rinsed thoroughly with water. Next, the electrode was dried at 150° C. for at least 8 hours before battery fabrication. Coin cells were fabricated using the manganese oxide coated nickel inverse structures as the cathode. Celgard 2500 and Nolvoyte were used as the separator and electrolyte, respectively.

The electrode capacity of manganese oxide coated nickel inverse structures was typically in the range of about 100-150 mAh/g. The capacity varies depending on the relative amount of nickel to manganese oxide and the quality of the manganese oxide. This ratio also affects the capacity retention at high rate discharge. Thicker manganese oxide coatings result in lower capacity retention as the discharge rate was increased. We suspect that this decrease in high rate capability was due to a combination of longer solid-state diffusion lengths and impeded electrolyte diffusion. As the manganese oxide gets thicker, lithium ions have to travel longer distances in the active material, which is limited by solid-state diffusion. Also, the pores inside the template get smaller as the manganese oxide gets thicker, limiting the lithium-ion diffusion in the electrolyte.

Figure 16A:
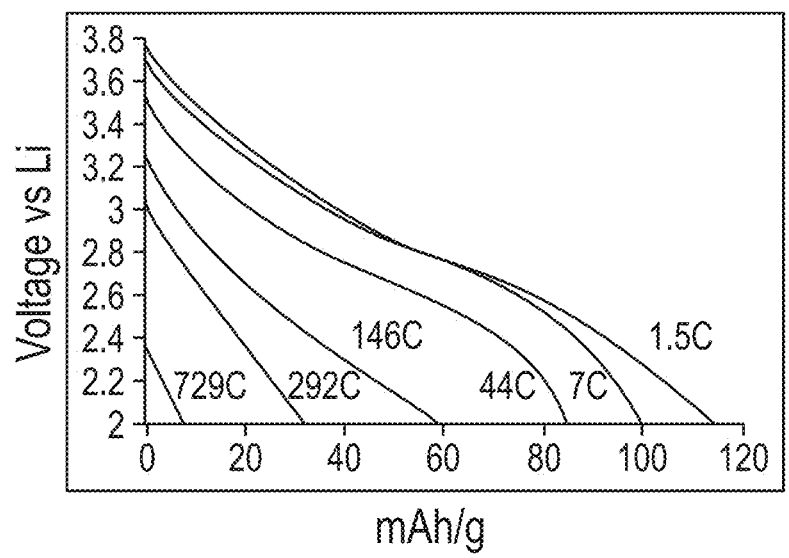
FIG. 16A is a half-cell plot of discharge curves at different C-rates for a cathode that is manganese oxide coated on a nickel inverse structure fabricated using a porous copper template. These data are normalized to the capacity at 1.5 C as described in Example 3.
Figure 16B:
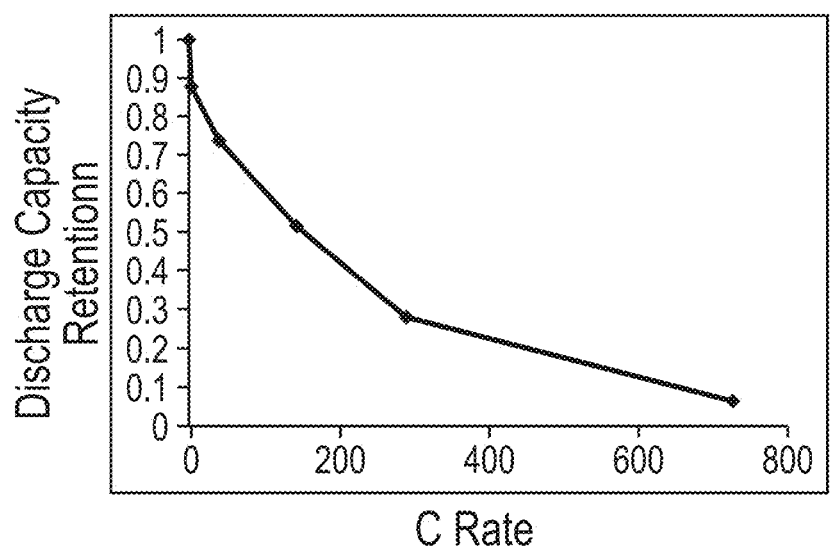
FIG. 16B is a half-cell plot of discharge capacity retention as a function of C-rate for a cathode that is manganese oxide coated on a nickel inverse structure fabricated using a porous copper template. These data are normalized to the capacity at 1.5 C as described in Example 3.
Figure 17:
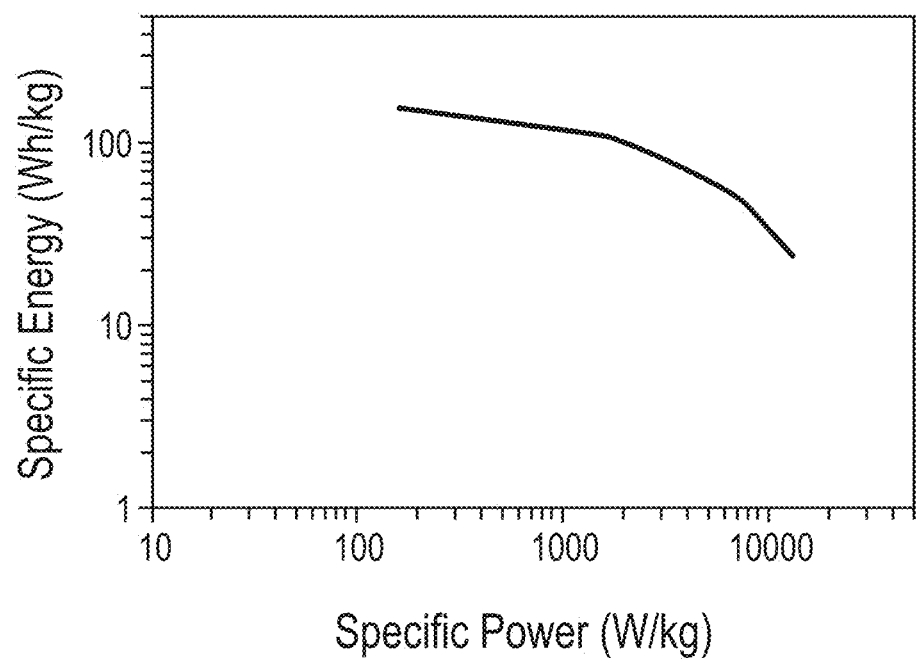
FIG. 17 is a Ragone chart of full-cell data. The cathode is lithium manganese oxide on a nickel inverse structure fabricated using a porous copper template as described in Example 3. The anode is carbon.

FIGS. 16A and 16B are plots describing the capacity retention as the discharge rate was increased for a typical cathode (manganese oxide coated on a nickel inverse structure fabricated using porous copper templates) vs. a lithium anode (half-cell). Discharge rate is represented using C-rate (rate of discharge relative to the maximum capacity of the electrode). For example, a 1 C discharge of a 1 Ah electrode corresponds to full discharge in 1 hour using 1 A. A 5 C discharge, for the same battery, corresponds to full discharge in 12 minutes using a current of 5 A. FIG. 17 is a Ragone chart of a typical cathode (manganese oxide coated on a nickel inverse structure fabricated using porous copper templates) vs. a carbon anode (full-cell data). Celgard 2500 was used as the separator. The mass used for these calculations included the cathode, anode, and separator. The cell was cycled between 3.8V and 2V. This data demonstrates the application of the monolithic open cell porous structure for a battery electrode. It should be understood that the structure, materials, and processes used for this demonstration were not fully optimized for this application.

4. Multi-Functional Carbon Inverse Structures from Copper Porous Templates

In this embodiment, a porous metal template was inverted to carbon. The highly porous carbon inverse structure is multi-functional for lithium-ion batteries. When used as anode, the carbon inverse structure can act as the lithium-ion intercalation material and the current collector. This is different from the previous examples because nickel was used as a current collector and an electrochemically active material was coated onto that nickel. However, another anode material, such as tin, silicon, aluminum, or lithium titanate, could be deposited on the carbon inverse structure to enhance the electrochemical performance. When used for the cathode of a lithium-ion battery, a carbon inverse structure can replace the nickel inverse structure described in the previous examples; carbon can serve as a porous current collector. The main advantages of using carbon instead of nickel on the cathode are that carbon is less dense than nickel (improving the gravimetric energy density of the lithium-ion battery) and carbon is more stable. Nickel will oxidize at the voltages encountered during lithium-ion battery cycling, whereas carbon will not.

Figure 18:
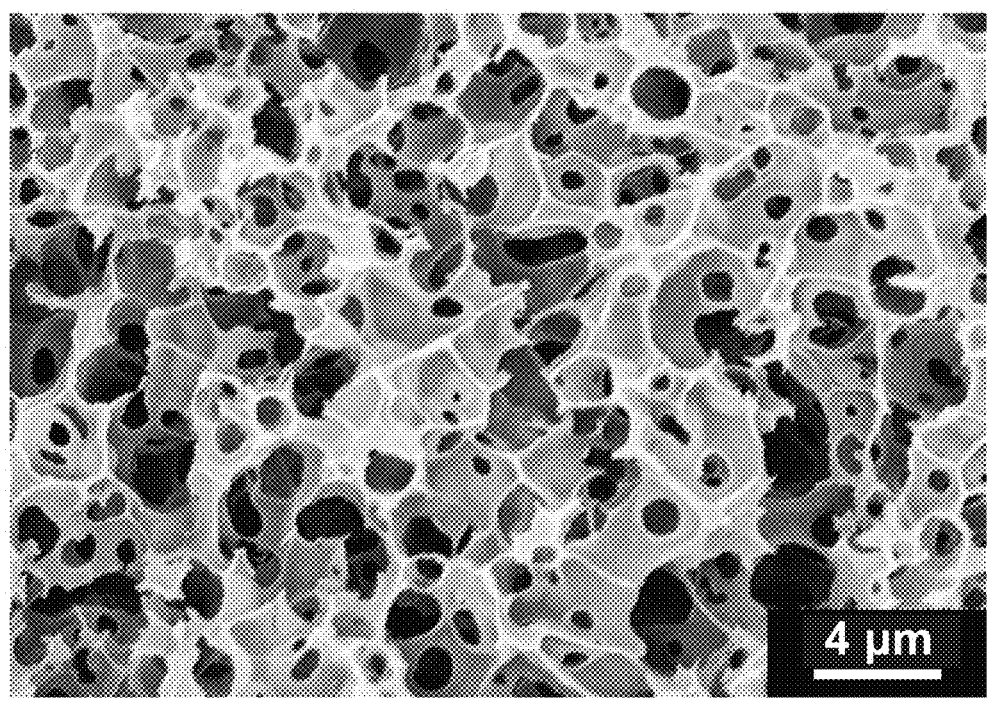
FIG. 18 is a fracture cross-section SEM micrograph of a carbon inverse structure fabricated using a porous aluminum template, similar to the template in FIG. 13 as described in Example 4.

Rigid porous templates were fabricated by pressing metal powers as described in the previous examples. Carbon inverse structures were fabricated by infiltrating the rigid porous templates with polymeric precursors that convert to carbon (carbonize) upon heating in an inert atmosphere. Multiple polymeric precursors can be carbonized including, but not limited to, polyacrylonitrile (PAN), pitch, rayon, polyfurfuryl alcohol, phenolic resin, polyethylene, polyresorcinol, polyacrylic acid, polyvinyl alcohol, polymethylmethacrylate. In this example, carbon inverse structures were fabricated by infiltrating a rigid porous template with furfuryl alcohol and oxalic acid (catalyst). Polymerization at 70° C. results in a template filled with poly furfuryl alcohol. Next, the polymer/template composite was heated to 500° C. to carbonize the polymer. The template was then removed using chemical etching resulting in the carbon inverse structure. Finally, the carbon inverse structure was heated to 1000° C. to enhance the conductivity of the carbon. FIG. 18 is a fracture cross-section SEM micrograph of a carbon inverse structure fabricated using an aluminum porous template. We also demonstrated the fabrication of carbon inverse structures using PAN, resorcinol, and melamine precursors.

To make a cathode for a lithium-ion battery, the highly porous carbon inverse structures were coated with manganese oxide as described in Example 3. The capacity retention is comparable to that observed for cathodes made using nickel inverse structures. However, the electrode-based capacity was 150-175 mAh/g when using carbon instead of nickel because of the low density of carbon. Also, the carbon was more electrochemically stable than the nickel allowing for charging to higher voltages.

Figure 19A:
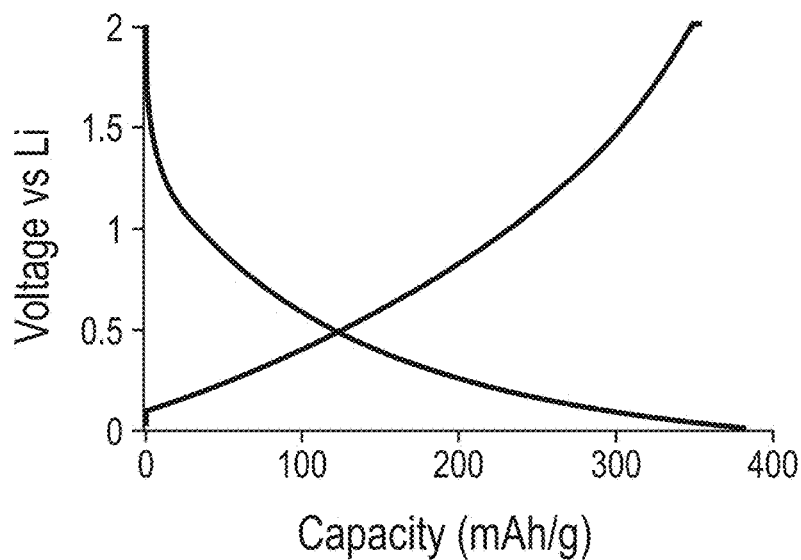
FIG. 19A is a half-cell charge and discharge curves of a carbon inverse anode fabricated using a porous aluminum template as described in Example 4.

Carbon is also anode material for a lithium-ion battery. The carbon inverse structure is an electron conductor and a lithium-ion intercalation material. FIG. 19A is a charge and discharge curve of a typical carbon inverse structure anode.

Figure 19B:
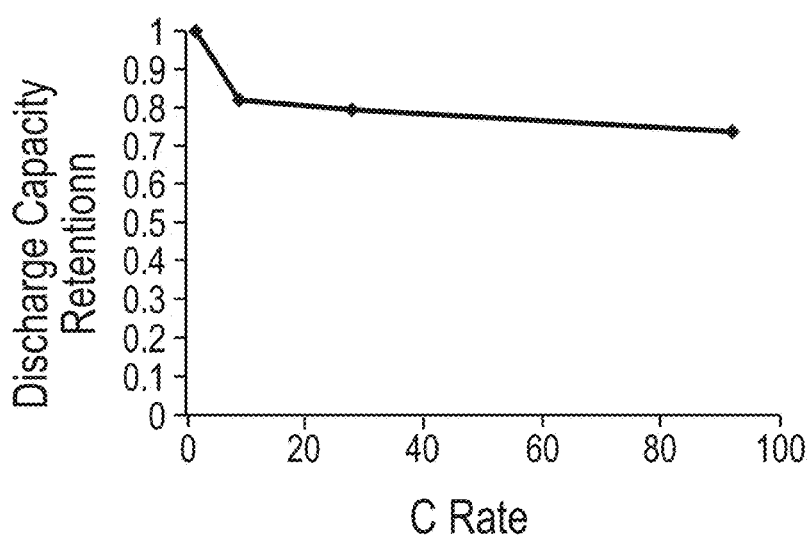
FIG. 19B is a half-cell discharge capacity retention as a function of C-rate of a carbon inverse anode fabricated using a porous aluminum template as described in Example 4.

FIG. 19B includes a plot of the graphite inverse capacity retention as a function of discharge rate. The 1 C discharge capacity of this carbon inverse structure is 360 mAh/g, which is close to the theoretical maximum of graphite (372 mAh/g). This carbon inverse was fabricated using polyfurfuryl alcohol. The maximum annealing temperature for this sample was 1000° C. It should be understood that the electrochemical properties of the carbon anodes will change depending on the polymer precursor, the annealing conditions, and the volume filling fraction of carbon.

In view of the above, it will be seen that the several objects of the disclosure are achieved and other advantageous results attained.

As various changes could be made in the above articles, compositions and methods without departing from the scope of the disclosure, it is intended that all matter contained in the above description and shown in the accompanying drawings shall be interpreted as illustrative and not in a limiting sense.

What is claimed is:

1. A process for the preparation of a monolithic porous open-cell structure, the process comprising
    forming a microparticulate mass to form a first template, the first template comprising a population of microparticles and interstitial volume between the microparticles within the mass, the surfaces of the microparticles within the first template having contacting surface regions that contact the surfaces of other microparticles within the mass and non-contacting surface regions bounding the interstitial volume,
    consolidating the microparticulate mass to form a second template wherein consolidating comprises compressing or sintering the microparticulate mass,
    infiltrating the second template with a framework material that coats the non-contacting surface regions of the microparticles,
    removing the second template to form a monolithic porous open-cell structure comprising a skeletal network comprising the framework material and having a void volume fraction of at least 25%; and
    electrochemically oxidizing or electrochemically converting the framework material to the corresponding oxide or sulfide after the second template is removed.

2. The process of claim 1 wherein
    (i) the population of microparticles comprises plastically deformable microparticles,
    (ii) consolidating the microparticulate mass to form the second template comprises compressing the microparticulate mass, and
    (iii) the plastically deformable microparticles are plastically deformed during the consolidating step.

3. The process of claim 1 wherein the microparticles comprised by the microparticulate mass have an average size in the range of about 10 nm to about 100 μm.

4. The process of claim 1 wherein the microparticles comprised by the microparticulate mass have a relative standard deviation of particle size in the range of 5% to 99%.

5. The process of claim 1 wherein the particle size distribution of the microparticles comprised by the microparticulate mass has two or more modes.

6. The process of claim 1 wherein the population of microparticles comprises regularly shaped microparticles having the shape of flakes, strands, spheres, ellipsoids, rods, or cubes.

7. The process of claim 1 wherein the microparticles within the microparticulate mass have an average aspect ratio of about 1:1 to about 10:1.

8. The process of claim 1 wherein the population of microparticles comprises microparticles containing aluminum, copper, chromium, cobalt, manganese, magnesium, nickel, silver, gold, tin, platinum, palladium, zinc, tungsten, tantalum, rhodium, molybdenum, titanium, iron, zirconium, vanadium, hafnium, silicon, indium, an alloy of any of the aforementioned elements, an oxide thereof, a nitride thereof, a carbide thereof, a silicide thereof, a boride thereof, or a combination of any of the foregoing elements, oxides, nitrides, carbides, silicides, and borides.

9. The process of claim 1 wherein the population of microparticles comprises microparticles selected from the group consisting of polystyrene, polymethylmethacrylate, polylactic acid, polyethylene, polyacrylic acid, polyglycolic acid, and the copolymers and polymer blends thereof.

10. The process of claim 1 wherein consolidating the microparticulate mass to form the second template comprises sintering the microparticulate mass.

11. The process of claim 1 wherein the second template is removed by de-alloying, electrochemical etching, wet chemical etching, reactive ion etching, chemical dissolution, thermal decomposition, or a combination thereof.

12. The process of claim 1 wherein infiltrating the second template with the framework material comprises at least two infiltrations of substantially the same area with the framework material.

13. The process of claim 1 wherein infiltrating the second template with the framework material comprises at least two infiltrations of substantially the same area with the framework material in separate steps, and wherein the framework material comprises a first framework material and a second framework material, the first and the second framework materials being compositionally distinct.

14. The process of claim 1 wherein infiltrating the second template with the framework material comprises at least two infiltrations of substantially the same area with the framework material in separate steps, and wherein the framework material comprises a first framework material and a second framework material, the first and the second framework materials being the same.

15. The process of claim 1 wherein the monolithic porous open-cell structure comprises unit cells having an average size in the range of about 10 nm to about 100 μm.

16. The process of claim 1 wherein the framework material is electrically conductive.

17. The process of claim 1 wherein the framework material is conformally coated after the second template is removed by chemical vapor deposition, chemical vapor infiltration, atomic layer deposition, sol-gel, spin coating, drop casting, or electrodeposition.

18. The process of claim 17 wherein the framework material is conformally coated with $Al_2O_3$, $HfO_2$, $ZrO_2$, $SiO_2$, or $TiO_2$.

19. The process of claim 1 wherein the monolithic porous open-cell structure is conformally coated with an electrochemically active material suitable for use as an anode or a cathode in a battery.

20. The process of claim 19 wherein the electrochemically active material is carbon (selected from any of the allotropes thereof), sulfur, tin, nickel, zinc, aluminum, silicon, lithium titanate, lithium, metal hydride, calcium, cadmium, magnesium lithium alloy, or an alloy thereof.

21. The process of claim 19 wherein at least 75% of all accessible available surfaces of the monolithic porous open-cell structure are conformally coated with the electrochemically active material.

22. The process of claim 21 wherein the electrochemically active material is an electrochemically active organic material, a lithiated manganese oxide, a lithiated cobalt oxide, a vanadium oxide, a mixed metal oxide, a nickel oxyhydroxide, a manganese dioxide, or a combination thereof.

23. A monolithic porous open-cell structure comprising a three-dimensional network of interconnected unit cells, the unit cells being bounded by a framework material, wherein the framework material is electrochemically oxidized or converted to the corresponding oxide or sulfide, the corresponding oxide or sulfide having interconnectivity windows for fluid flow between the unit cells, the monolithic porous open-cell structure having a void volume fraction of at least 25%, the unit cells have an average size in the range of about 10 nm to about 100 μm, and an average aspect ratio in the range of about 1:1 to about 10:1.

24. A primary or secondary battery comprising the monolithic porous open-cell structure of claim 23.

* * * * *